US009361255B2

(12) United States Patent
Shimada et al.

(10) Patent No.: US 9,361,255 B2
(45) Date of Patent: Jun. 7, 2016

(54) METHOD FOR CONTROLLING I/O SWITCH, METHOD FOR CONTROLLING VIRTUAL COMPUTER, AND COMPUTER SYSTEM

(75) Inventors: Keita Shimada, Tokyo (JP); Yoshifumi Takamoto, Tokyo (JP); Tomohito Uchida, Tokyo (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 14/007,632

(22) PCT Filed: Jun. 6, 2011

(86) PCT No.: PCT/JP2011/062954
§ 371 (c)(1),
(2), (4) Date: Sep. 25, 2013

(87) PCT Pub. No.: WO2012/168995
PCT Pub. Date: Dec. 13, 2012

(65) Prior Publication Data
US 2014/0019667 A1    Jan. 16, 2014

(51) Int. Cl.
G06F 13/00    (2006.01)
G06F 13/14    (2006.01)
G06F 13/40    (2006.01)
G06F 3/06     (2006.01)
H04L 12/24    (2006.01)
G06F 11/14    (2006.01)

(52) U.S. Cl.
CPC .......... *G06F 13/4022* (2013.01); *G06F 3/0605* (2013.01); *G06F 3/067* (2013.01); *G06F 3/0629* (2013.01); *G06F 3/0635* (2013.01); *G06F 11/1464* (2013.01); *H04L 41/0856* (2013.01); *G06F 2213/0026* (2013.01)

(58) Field of Classification Search
None
See application file for complete search history.

(56) References Cited

U.S. PATENT DOCUMENTS

2002/0144069 A1   10/2002  Arakawa et al.
2008/0127199 A1    5/2008  Miki
(Continued)

FOREIGN PATENT DOCUMENTS

JP    2002-297456 A    10/2002
JP    2008-009497 A     1/2008
(Continued)

OTHER PUBLICATIONS

International Search Report received in PCT/JP2011/062954 dated Jul. 12, 2011.

*Primary Examiner* — David E Martinez
(74) *Attorney, Agent, or Firm* — Foley & Lardner LLP

(57) ABSTRACT

The present invention is provided with: computers provided with a processor, a memory, and an I/O interface; an I/O switch for connecting a plurality of the computers with an I/O adapter; a management computer for managing the I/O switch and the computers; and a first network for connecting the computers with the management computer. The I/O switch has a dedicated adaptor connected to the management computer. The management computer selects from the plurality of computers a computer for performing data transfer, commands the I/O switch to connect the I/O interface of the selected computer and the dedicated adaptor, transfers data between the selected computer, senses that data transfer with the selected computer has been completed, and commands the I/O switch to disconnect the dedicated adaptor from the I/O interface of the selected computer after completion of the data transfer with the selected computer has been sensed.

18 Claims, 34 Drawing Sheets

(56) References Cited

U.S. PATENT DOCUMENTS

2009/0307341 A1    12/2009  Minato
2010/0049916 A1*   2/2010   Nakajima ............ G06F 3/0611
                                                          711/114

FOREIGN PATENT DOCUMENTS

| | | |
|---|---|---|
| JP | 2009-294810 A | 12/2009 |
| JP | 2011-060306 A | 3/2011 |

* cited by examiner

Fig. 6

| SERVER IDENTIFIER | PCIe PORT | DISK CAPACITY | SERVER MODEL | CONFIGURATION | PERFORMANCE INFORMATION |
|---|---|---|---|---|---|
| SERVER 1 | 1 | 10GB | A CORPORATION SERVER MODEL 1 | IA32 | CPU:3GHz/core:4<br>memory:4GB<br>HDD(SAS):120GB<br>NIC:1Gbps, HBA:3Gbps |
| SERVER 2 | 2 | 50GB | A CORPORATION SERVER MODEL 1 | IA32 | CPU:3GHz/core:4<br>memory:4GB<br>HDD(SAS):120GB<br>NIC:1Gbps, HBA:3Gbps |
| SERVER 3 | 5 | 100GB | A CORPORATION BLADE SERVER MODEL 2 | Chassis1<br>Slot1<br>SMP:No<br>IA32 | CPU:2GHz/core:2<br>memory:4GB<br>NIC:1Gbps, HBA:3Gbps |
| SERVER 4 | 7 | 10GB | A CORPORATION BLADE SERVER MODEL 2 | Chassis2<br>Slot1<br>SMP:No<br>IA32 | CPU:2GHz/core:2<br>memory:4GB<br>NIC:1Gbps, HBA:3Gbps |
| SERVER 5 | 6 | 1TB | B CORPORATION SERVER MODEL 3 | IA32 | CPU:1.6GHz/core:4<br>memory:4GB<br>HDD(SATA):80GB<br>NIC:1Gbps, HBA:3Gbps |
| SERVER 6 | 3 | 100GB | B CORPORATION BLADE SERVER MODEL 4 | Chassis4<br>Slot1<br>HA:Yes<br>IA32 | CPU:1.6GHz/core:4<br>memory:4GB<br>HDD(SATA):80GB<br>NIC:1Gbps, HBA:3Gbps |
| SERVER 7 | 4 | 50GB | B CORPORATION BLADE SERVER MODEL 4 | Chassis4<br>Slot2<br>HA:Yes<br>IA32 | CPU:1.6GHz/core:4<br>memory:4GB<br>HDD(SATA):80GB<br>NIC:1Gbps, HBA:3Gbps |
| ⋮ | ⋮ | ⋮ | ⋮ | ⋮ | ⋮ |

Column labels: 601, 602, 603, 604, 605, 606

Fig. 7

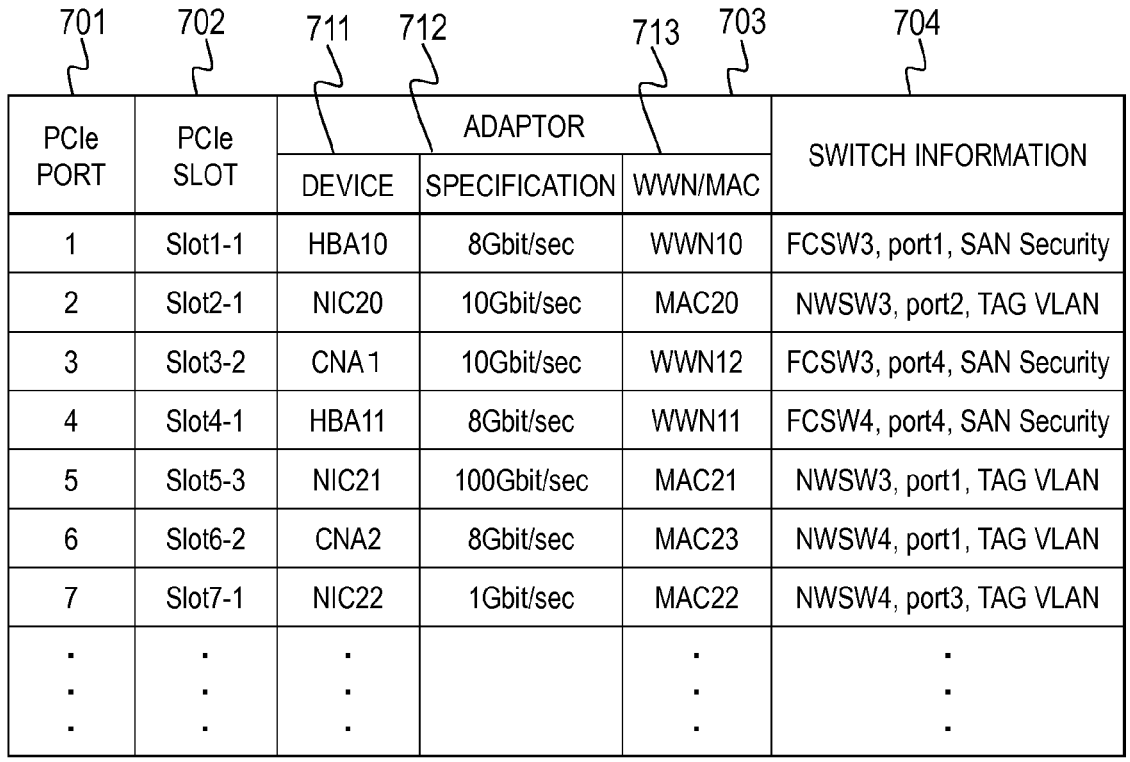

| PCIe PORT | PCIe SLOT | ADAPTOR | | | SWITCH INFORMATION |
|---|---|---|---|---|---|
| | | DEVICE | SPECIFICATION | WWN/MAC | |
| 1 | Slot1-1 | HBA10 | 8Gbit/sec | WWN10 | FCSW3, port1, SAN Security |
| 2 | Slot2-1 | NIC20 | 10Gbit/sec | MAC20 | NWSW3, port2, TAG VLAN |
| 3 | Slot3-2 | CNA1 | 10Gbit/sec | WWN12 | FCSW3, port4, SAN Security |
| 4 | Slot4-1 | HBA11 | 8Gbit/sec | WWN11 | FCSW4, port4, SAN Security |
| 5 | Slot5-3 | NIC21 | 100Gbit/sec | MAC21 | NWSW3, port1, TAG VLAN |
| 6 | Slot6-2 | CNA2 | 8Gbit/sec | MAC23 | NWSW4, port1, TAG VLAN |
| 7 | Slot7-1 | NIC22 | 1Gbit/sec | MAC22 | NWSW4, port3, TAG VLAN |
| ... | ... | ... | | ... | ... |

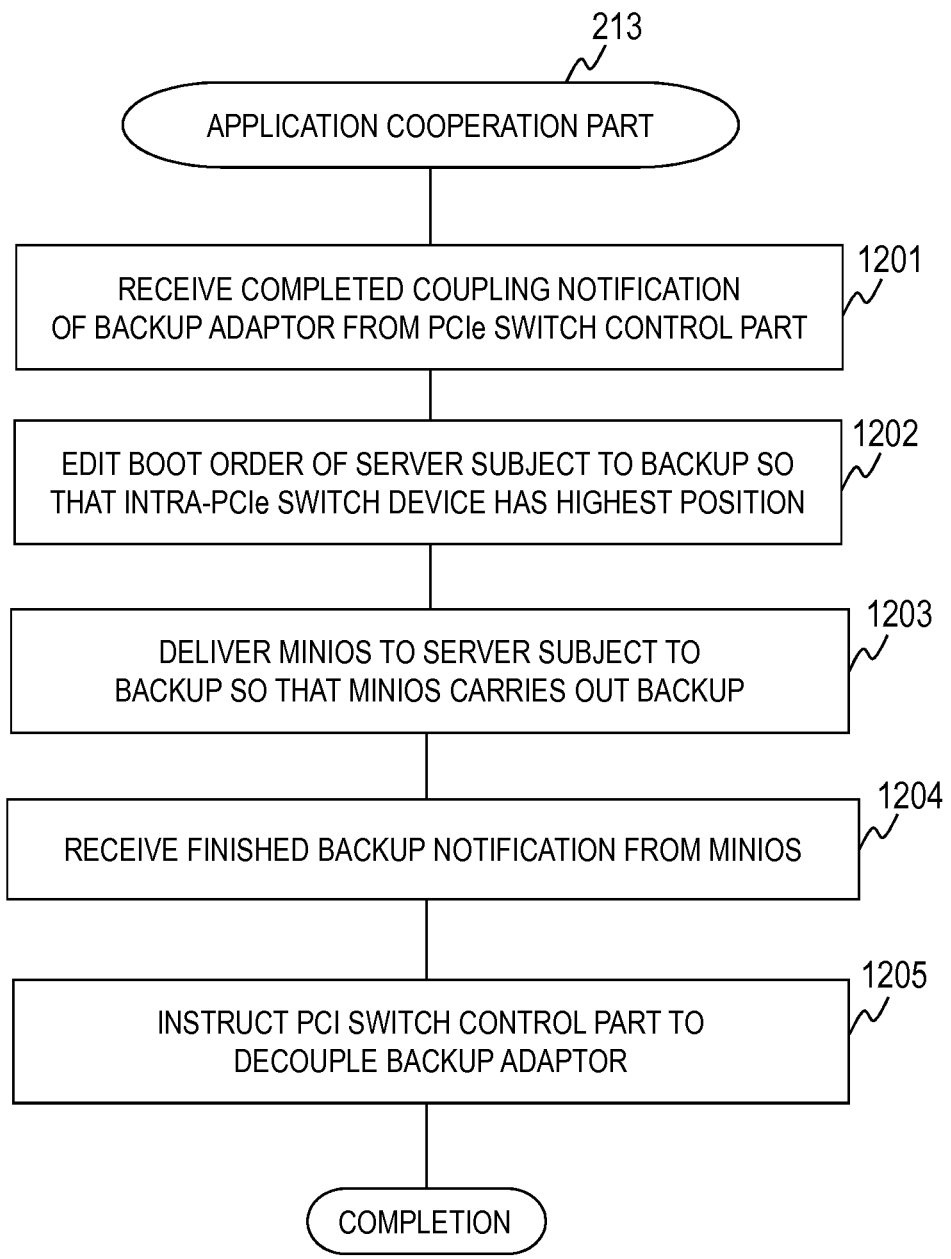

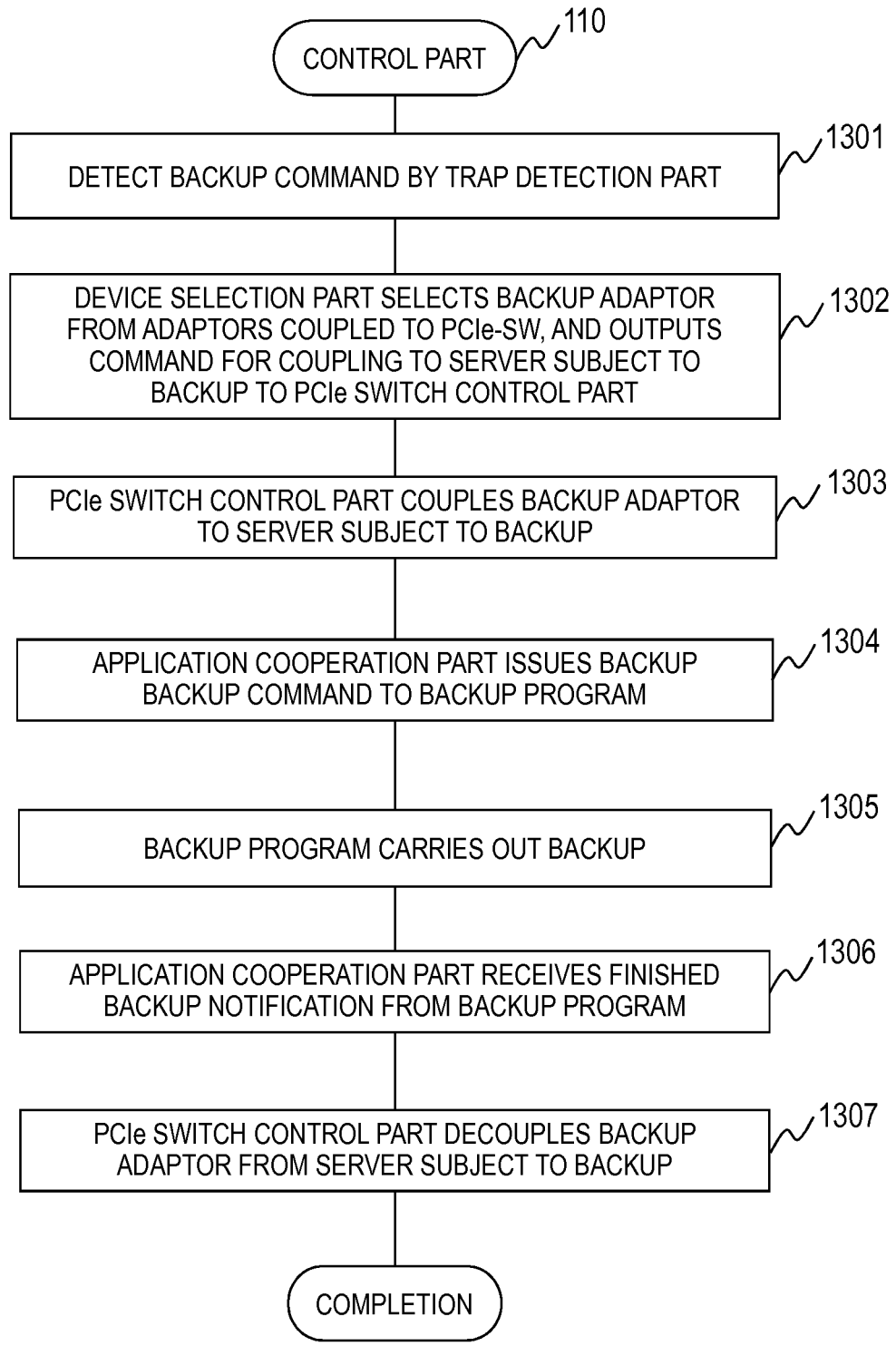

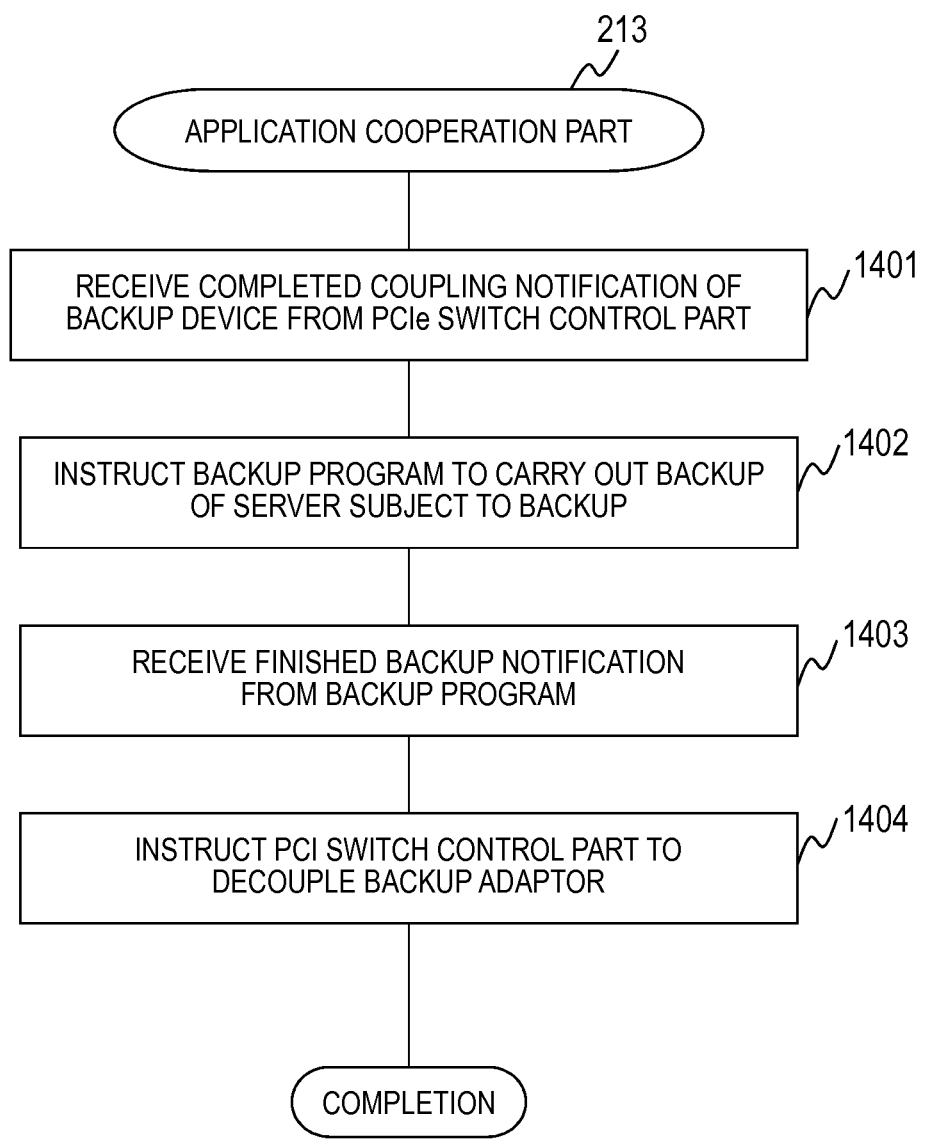

Fig. 15

| NETWORK SWITCH (1501) | USED BANDWIDTH AMOUNT (1504) | SERVER IDENTIFIER (1502) | COUPLED TO (1503) |
|---|---|---|---|
| NWSW1 | 150Mbit/sec | SERVER 1 | — |
| | | SERVER 2 | — |
| | | SERVER 3 | — |
| | | SERVER 4 | ADAPTER |
| | | SERVER 5 | — |
| | | SERVER 6 | — |
| | | SERVER 7 | — |
| NWSW2 | 200Mbit/sec | SERVER 3 | — |
| | | SERVER 4 | — |
| | | SERVER 5 | — |
| | | SERVER 6 | — |
| | | SERVER 7 | — |
| NWSW3 | 1Gbit/sec | SERVER 2 | — |
| | | SERVER 3 | — |
| NWSW4 | 10Gbit/sec | SERVER 4 | — |
| | | SERVER 5 | — |
| NWSW5 | 100Mbit/sec | SERVER 8 | — |
| ⋮ | 300Mbit/sec | ⋮ | ⋮ |
| VNWSW1 | 100Mbit/sec | VIRTUAL SERVER 1 | NWSW1 |
| VNWSW2 | 50Mbit/sec | VIRTUAL SERVER 2 | NWSW2 |
| | | VIRTUAL SERVER 3 | ADAPTER |
| ⋮ | | ⋮ | ⋮ |

Fig. 16

| SERVER IDENTIFIER (1601) | BUSINESS TASK TYPE (1602) | BUSINESS TASK IMPORTANCE DEGREE (1603) | OPERATION SCHEDULE (1604) | USED BANDWIDTH AMOUNT (1605) |
|---|---|---|---|---|
| SERVER 1 | SERVER FOR PROCESSING INSIDE BUSINESS TASK A | A | 8:00-18:00 | 10Mbit/sec |
| SERVER 2 | SERVER FOR PROCESSING INSIDE BUSINESS TASK B | B | 18:00-0:00<br>0:00-8:00 | 10Mbit/sec |
| SERVER 3 | SERVER FOR INVENTORY MANAGEMENT SYSTEM | A | 0:00-24:00 | 100Mbit/sec |
| SERVER 4 | SERVER FOR SECTION | C | 8:00-18:00 | 10Mbit/sec |
| SERVER 5 | SYSTEM MANAGEMENT SERVER | A | 0:00-24:00 | 10Mbit/sec |
| SERVER 6 | WEB SERVER FOR OUTSIDE | C | 0:00-24:00 | 1Mbit/sec |
| SERVER 7 | WEB SERVER FOR INSIDE | C | 0:00-24:00 | 1Mbit/sec |
| ... | ... | ... | ... | ... |

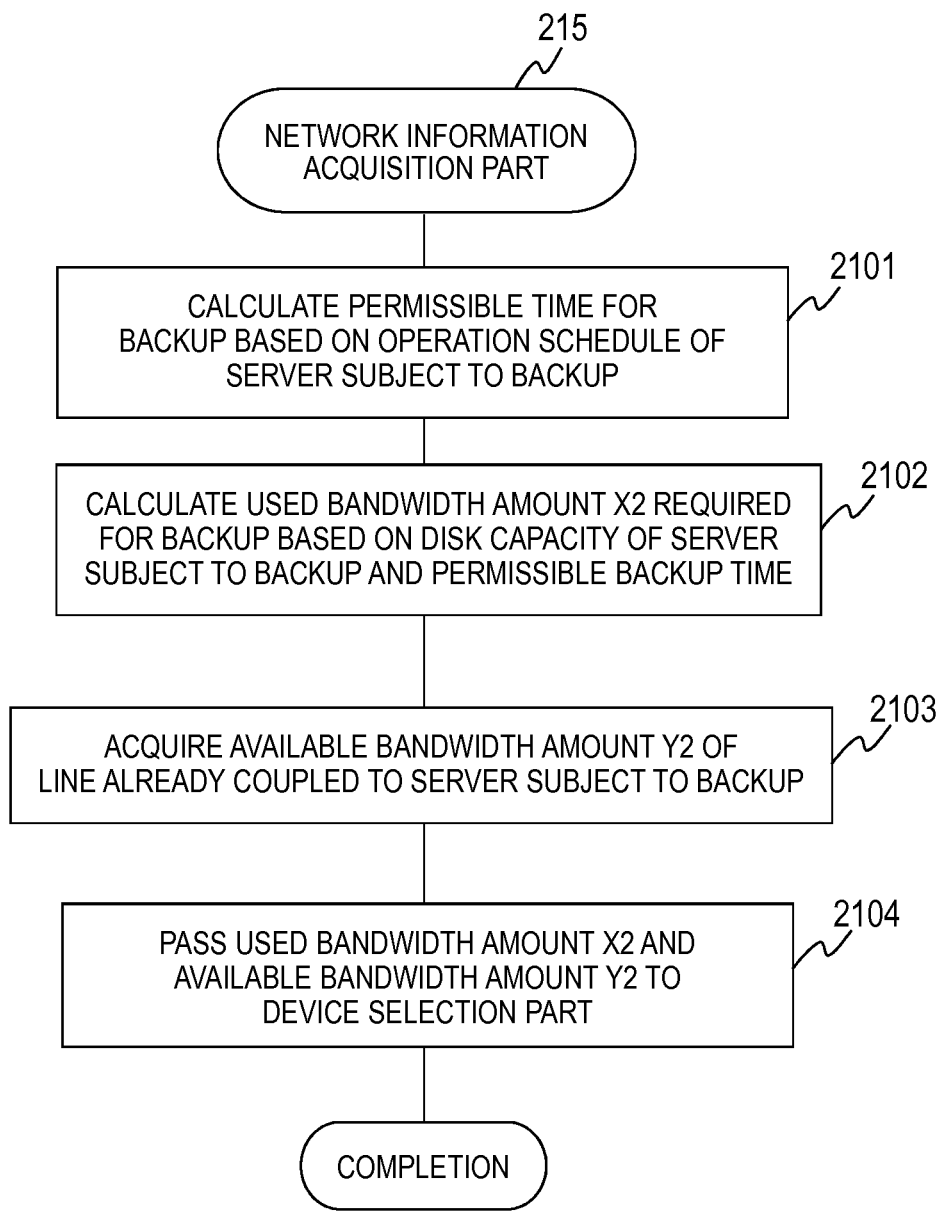

METHOD FOR CONTROLLING I/O SWITCH, METHOD FOR CONTROLLING VIRTUAL COMPUTER, AND COMPUTER SYSTEM

CROSS REFERENCE TO RELATED APPLICATIONS

The present application is a National Stage of International Application No. PCT/JP2011/062954 tiled on Jun. 6, 2011, the entire disclosures of which are incorporated herein by reference.

BACKGROUND

This invention relates to a technology for assigning a dedicated line for backup during the backup, thereby restraining bandwidth suppression on a network for servers other than a server subject to the backup.

Currently, there is such a trend in a market that resources of entire IT apparatus in a datacenter are managed by using a product for managing the IT apparatus in a unified manner. Moreover, as a result of a prevailing server virtualization technology, the number of the IT apparatus and servers including virtual servers subject to the management tends to increase. As a result, an amount of data resulting from management information such as state information, performance information, configuration information, and fault information frequently acquired from the apparatus subject to the management increases, and it is anticipated that the large amount of management information occupies a most part of a bandwidth of a management network.

On the other hand, with the number of the servers being increased, the frequency of carrying out backups increases. The conventional backup is carried out by coupling a server subject to the backup and a storage apparatus to each other via a management network, and storing contents of the server in the storage apparatus. As this type of backup technology, for example, Japanese Patent Application Laid-open No. 2002-297456 is known. In Japanese Patent Application Laid-open No. 2002-297456, there is disclosed a backup processing method involving, in backup processing, going through two steps of selecting resources to be used for the backup out of resources that can be used for the backup, and selecting a switch apparatus for generating paths between the selected resources, and carrying out the backup to the resources that can be used.

SUMMARY

In the above-mentioned conventional example, there is disclosed a method for securing the plurality of paths for the backup, but there is not disclosed a method involving generating a dedicated line for the backup, and selecting the dedicated line as a backup path in order to decrease an influence on systems independent of the backup. In other words, in the conventional example, a bandwidth for management information is decreased by an amount of a bandwidth of a management network used for data transfer such as the backup and the like. Therefore, the bandwidth of the management network becomes insufficient, and there has been such a problem that congestion is generated by retransmission of the management information and the like.

This invention has been made in view of the above-mentioned problem, and therefore has an object to provide a computer system capable of smoothly communicating management information while backup of a server is being carried out.

A representative aspect of the present disclosure is as follows. A method of controlling an I/O switch in a computer system, the computer system comprising: a computer including a processor, a memory, and an I/O interface; the I/O switch for coupling the I/O interface of each of a plurality of the computers and an I/O adaptor to each other; a management computer for managing the I/O switch and the plurality of the computers; and a first network for coupling the plurality of the computers and the management computer to each other, the I/O switch transferring data between the management computer and the plurality of the computers, the I/O switch including a dedicated adaptor coupled to the management computer, the method comprising: a first step of selecting, by the management computer, the computer for transferring the data out of the plurality of the computers based on a predetermined condition; a second step of instructing, by the management computer, the I/O switch to couple the I/O interface of the selected computer and the dedicated adaptor to each other; a third step of transferring, by the management computer, the data to/from the selected computer; a fourth step of detecting, by the management computer, completion of the transfer of the data to/from the selected computer; and a fifth step of instructing, by the management computer, after the detection of the completion of the transfer of the data to/from the selected computer, the I/O switch to decouple the dedicated adaptor from the I/O interface of the selected computer.

According to this invention, data for backup, for example, can be transferred by using a PCIe switch without an influence on business tasks on other servers.

BRIEF DESCRIPTION OF THE DRAWINGS

FIG. 6 shows the server/PCIe port management table according to the first embodiment of this invention.

FIG. 7 shows the intra-PCIe switch device management table according to the first embodiment of this invention.

FIG. 12 is a flowchart illustrating an example of processing carried out by the application cooperation part of the management server according to a first embodiment of this invention.

FIG. 13 is a flowchart illustrating an example of processing carried out by the control part according to a second embodiment.

FIG. 14 is a flowchart illustrating an example of processing carried out by the application cooperation part of the management server according to the second embodiment.

FIG. 15 shows an example of the network topology management table according to the first embodiment of this invention.

FIG. 16 shows the business task type management table according to the first embodiment of this invention.

FIG. 30 is a flowchart illustrating an example of processing carried out by the network information acquisition part according to the sixth embodiment of this invention.

DETAILED DESCRIPTION OF THE PREFERRED EMBODIMENTS

Embodiments of this invention are described below with reference to the accompanying drawings.

<First Embodiment>

Figure 1:
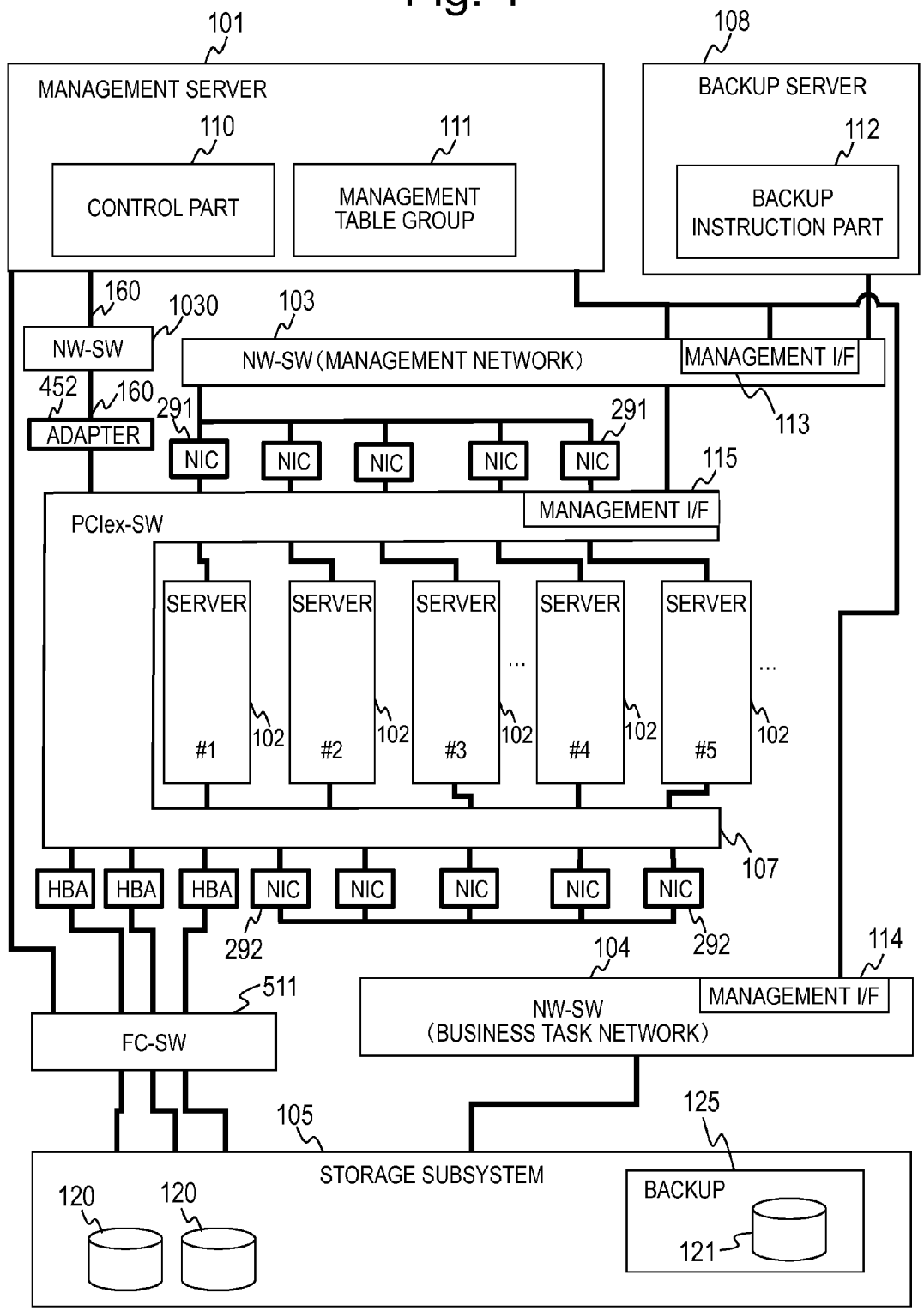
FIG. 1 is a block diagram illustrating an example of a computer system according to a first embodiment of this invention.

FIG. 1 is a block diagram illustrating an example of a computer system according to a first embodiment of this invention. A management server 101 is coupled via a network switch for management (NW-SW) 103 to a management interface (management I/F) 113 of the NW-SW 103, and to a management interface 114 of a network switch for business task (NW-SW) 104. A virtual LAN (VLAN) of each of the NW-SWs 103 and 104 can be configured from the management server 101. Moreover, to the network switch for management 103, in addition to the management server 101 and a plurality of servers 102, a backup server 108 for issuing a command for backup of each of the servers 102 is coupled.

The NW-SW 103 constructs a network for the management server 101 to manage the plurality of severs 102. The management server 101 manages operations such as distribution of an OS and applications running on the respective servers 102 and power supply control. The NW-SW 104 constructs a network for business task, which is a network used by business task applications executed on the servers 102. The NW-SW 104 is coupled to a WAN or the like for communicating to/from client computers outside the computer system.

The management server 101 is coupled via a fiber channel switch (FC-SW) 511 to a storage subsystem 105. The management server 101 manages data 120 and data 121 in the storage subsystem 105. Further, the plurality of servers 102 are also coupled via the fiber channel switch (FC-SW) 511 to the storage subsystem 105.

On the management server 101, a control part 110 is running, and refers to and updates a management table group 111. The management table group 111 is updated or configured by the control part 110 as described later.

The plurality of servers 102 subject to the management by the management server 101 are coupled via a PCIe-SW 107 to the NW-SWs 103 and 104. To the PCIe-SW 107, I/O devices (I/O adaptors such as network interface cards (NICs), host bus adapters (HBAs), and converged network adapters (CNAs) or I/O devices) compliant with the PCI Express (I/O interface) standard are coupled. In general, the PCIe-SW 107 is hardware enabling extending a bus of the PCI Express out from a mother board of the server 102 to couple more PCI-EXpress devices.

The PCIe-SW 107 is coupled via a dedicated adaptor 452 and a dedicated line 160 to the management server 101. The dedicated adaptor 452 is an I/O adaptor for coupling the PCIe-SW 107 to the management server 101. The dedicated line 160 forms a communication path for coupling the dedicated adaptor 452 and the management server 101 to each other. The dedicated line 160 may route via a network switch such as a backup network switch 1030, or may directly couple the dedicated adaptor 452 and the management server 101 to each other. Moreover, if a dedicated bandwidth is secured for the backup on the management network 103 or the business task network 104, the dedicated line 160 may route via the management network 103 or the business task network 104. In addition, the PCIe-SW 107 functions as an I/O switch for coupling the dedicated adaptor 452 coupled to the dedicated line 160 to any one of the plurality of servers 102.

The backup server 108 includes a backup instruction part 112 for receiving a backup command from a user (or a management terminal (not shown)), and giving an instruction to execute the backup. It should be noted that the management server 101 may include the backup instruction part 112 so that the management server 101 provides a backup server.

When the management server 101 acquires backup data 121 of the server 102 subject to management, the management server 101 switches a communication path in the PCIe-SW 107, and couples the dedicated adaptor 452 for the backup coupled to the management server 101 to the server 102 subject to backup. Then, the management server 101 uses the dedicated adaptor 452 and the dedicated line 160 to acquire the backup data of the server 102 subject to backup. As a result, the management server 101 and the server 102 subject to backup are coupled to each other via the dedicated line 160, and hence the backup of the server 102 can be carried out at a high speed without suppression on the bandwidth of the NW-SW 103 constructing the management network.

Figure 2:
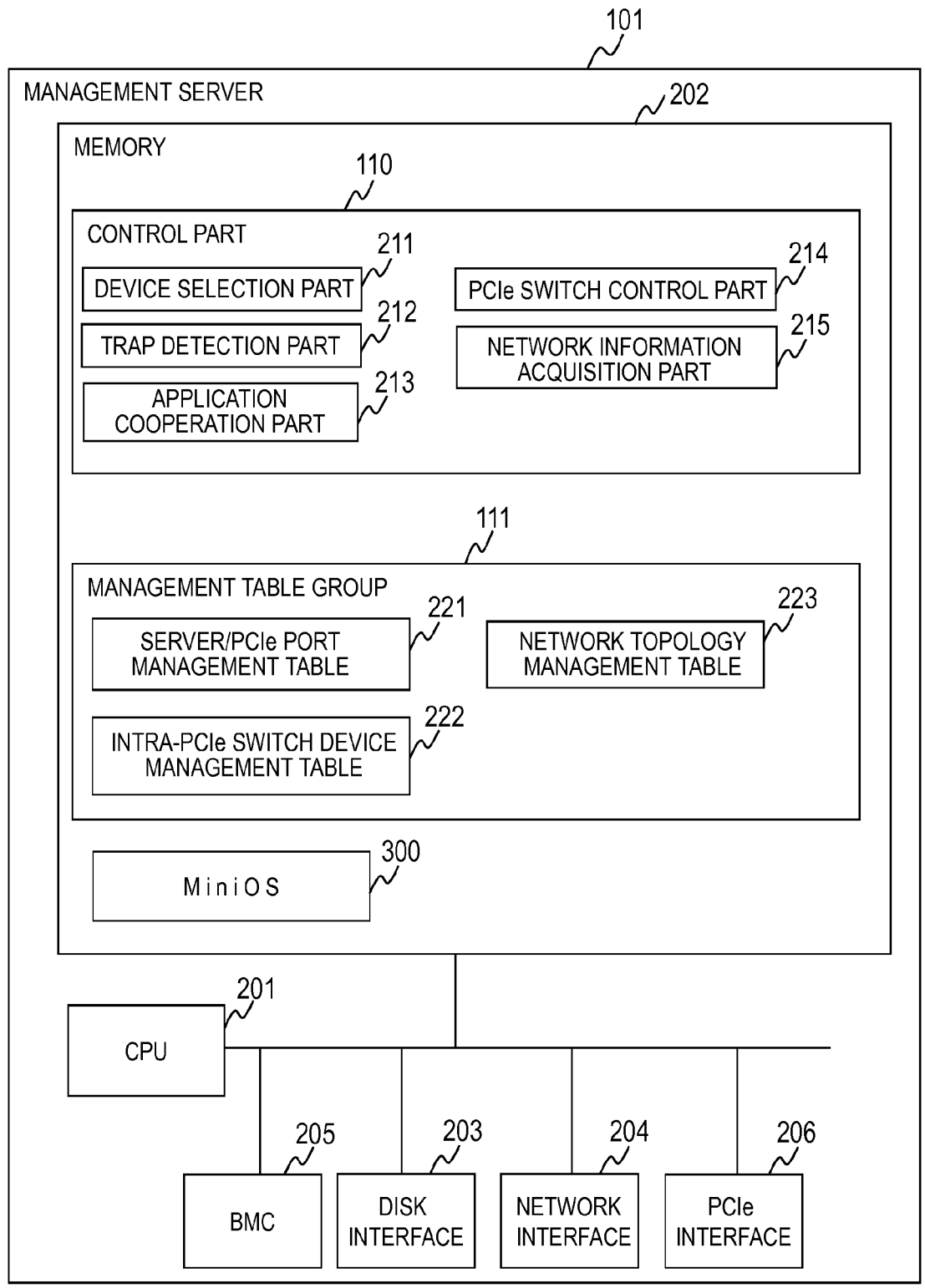
FIG. 2 is a block diagram illustrating a configuration of the management server according to the first embodiment of this invention.

FIG. 2 is a block diagram illustrating a configuration of the management server 101. The management server 101 includes a central processing unit (CPU) 201 for carrying out calculation, a memory 202 for storing programs executed by the CPU 201, and data required for the execution of the programs, a disk interface 203 for making access to the storage subsystem 105 for storing the programs and the data, and a network interface 204 for communication via an IP network.

In the management server 101 of FIG. 2, representative one is illustrated for each of the network interface 204 and the disk interface 203, but a plurality thereof exist. For example, for the respective couplings to the management network 103 and the business task network 104, network interfaces 204 different from each other are used.

In the memory 202, the control part 110 and the management table group 111 are stored. The control part 110 includes a device selection part 211 (refer to FIG. 10), a trap detection part 212 (refer to FIG. 9), an application cooperation part (or a data transfer part) 213 (refer to FIG. 12), a PCIe switch control part 214 (refer to FIG. 11), and a network information acquisition part 215.

The respective functional parts including the device selection part 211, the trap detection part 212, the application cooperation part 213, the PCIe switch control part 214, and the network information acquisition part 215 to be generated are loaded as programs on the memory 202.

The CPU 201 operates depending on the program of each of the functional parts, thereby operating as the functional part for realizing a predetermined function. For example, the CPU 201 operates depending on a device selection program to function as the device selection part 211. The same holds true for the other programs. Further, the CPU 201 also operates as functional parts for realizing a plurality of respective pieces of processing carried out by the respective programs. The computer and the computer system are an apparatus and a system including those functional parts.

The management table group 111 includes a server/PCIe port management table 221 (refer to FIG. 6), an intra-PCIe switch device management table 222 (refer to FIG. 7), and a network topology management table 223 (refer to FIG. 15).

Information collection for each of the tables may be automatic collection by using a standard interface or an information collection program, or a manual input by the user (or the management terminal). It should be noted that information other than information to which limit values are determined by physical requirements and requirements by laws out of information such as rules and policies in each of the tables needs to be input by the user or an administrator in advance, and an interface for the input needs to be provided for the management server 101. Moreover, the same interface for inputting conditions is also necessary when an operation within the limit values is carried out by a policy of the user.

The types of the server 102, the management server 101, and the backup server 108 may be any of a physical server, a blade server, a virtualized server, and a server partitioned logically or physically, and effects of this invention can be provided by using any one of those servers.

Moreover, the backup server 108 has such a configuration that the control part 110 of the management server 101 is replaced by the backup instruction part 112.

Information such as programs and tables for realizing each of the functions of the control part 110 can be stored in memory devices such as the storage subsystem 105, a non-volatile semiconductor memory, a hard disk drive, and a solid state drive (SSD), and a computer readable non-transitory data storage medium such as an IC card, an SD card, and a DVD.

Figure 3:
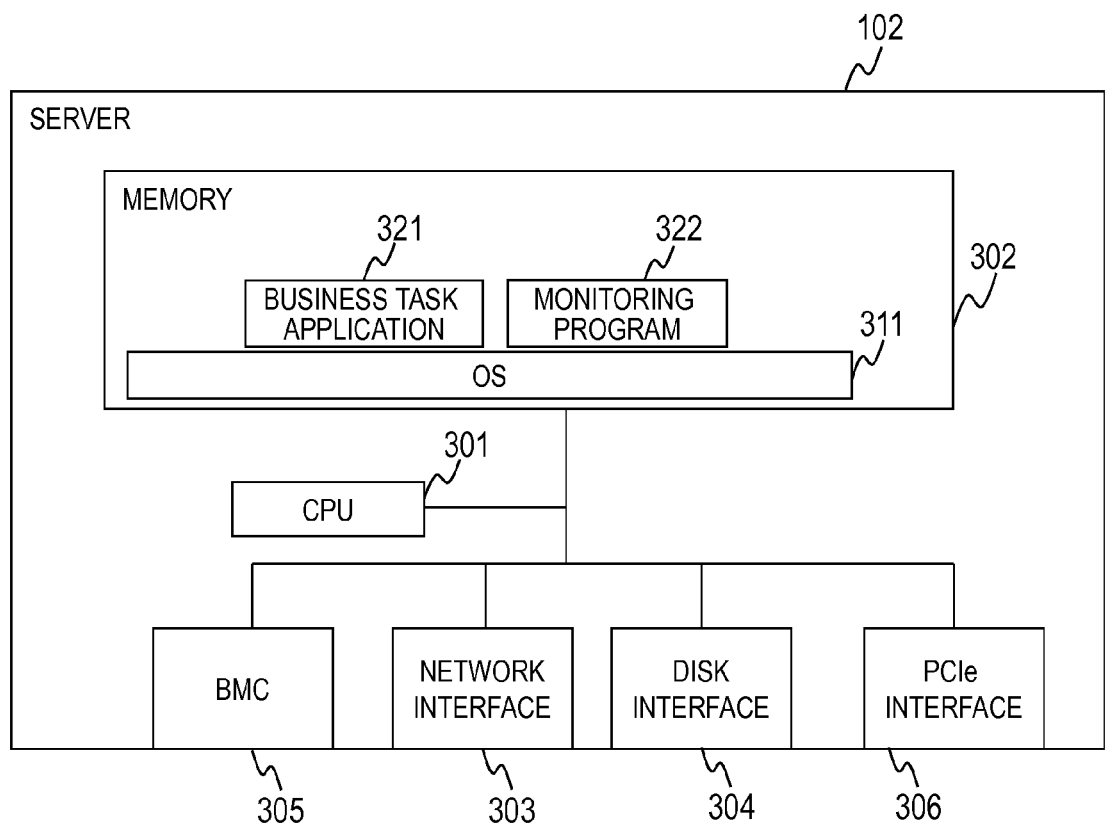
FIG. 3 is a block diagram illustrating a configuration of the server according to the first embodiment of this invention.

FIG. 3 is a block diagram illustrating a configuration of the server 102. The server 102 includes a CPU 301 for carrying out calculation, a memory 302 for storing programs executed by the CPU 301, and data required for the execution of the programs, a disk interface 304 for making access to the storage subsystem 105 for storing the programs and the data, a network interface 303 for communication performed via the IP network, a basement management controller (BMC) 305 for carrying out the power supply control, and controlling the respective interfaces, and a PCI-Express interface 306 for coupling to the PCIe-SW 107. An OS 311 on the memory 302 is executed by the CPU 301, thereby carrying out device management in the server 102. Under the OS 311, an application 321 for providing a business task, a monitoring program 322, and the like are executed.

In FIG. 3, representative one is illustrated for each of the network interface 303, the disk interface 304, and the PCIex interface 306, but a plurality thereof exist. For example, for the respective couplings to the management network 103 and the business task network 104, PCIex interfaces 306 different from each other may be used. This embodiment describes such an example that each of the servers 102 is coupled via the PCI-Express interface 306, the PCIe-SW 107, and network interfaces (NICs in the FIGS. 291 and 292 to the management network (NW-SW 103) and the business task network (NW-SW 104). It should be noted that the network interfaces (NICs in the FIG. 291 represent I/O adaptors coupled to the management network (NW-SW 103), and the network interfaces (NICs in the FIG. 292 represent I/O adaptors coupled to the business task network (NW-SW 104).

It should be noted that the coupling between each of the servers 102 and each of the networks is not limited to the configuration described above, and each of the servers 102 may be coupled via the network interface 303 to the management network (NW-SW 103) and the business task network (NW-SW 104).

Figure 4:
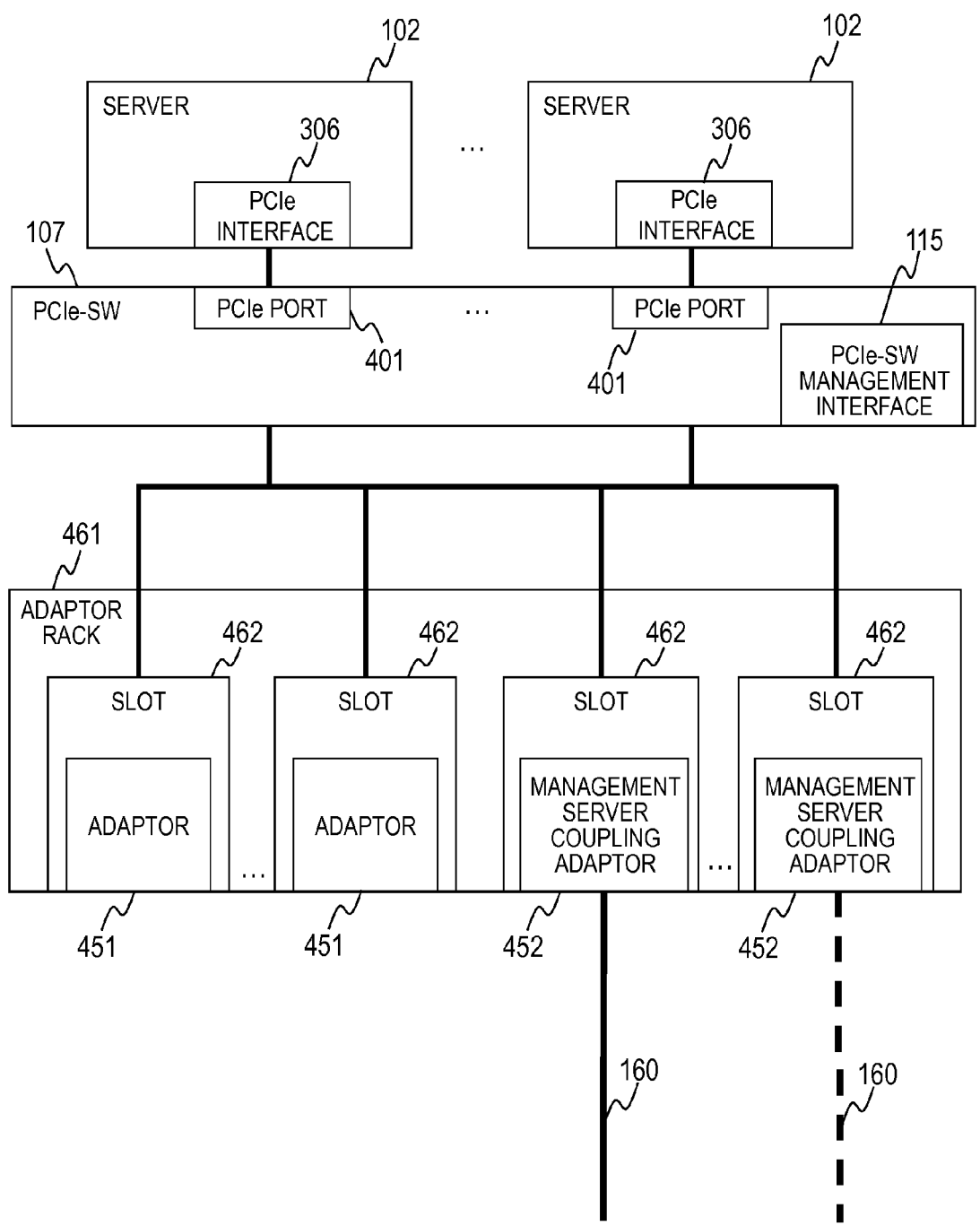
FIG. 4 is a block diagram illustrating a configuration of the PCIe-SW 107 according to the first embodiment of this invention.

FIG. 4 illustrates a coupling configuration around the PCIe-SW 107 among the servers 102, an adaptor rack 461 storing the PCI-Express adaptors 451 and the dedicated adaptors 452, the adaptors 451, and the dedicated adaptors 452. It should be noted that the adaptor 451 and the dedicated adaptor 452 are constructed by the NICs, HBAs, and CNAs as illustrated in FIG. 1.

The PCIe-SW 107 and the servers 102 are coupled to each other via the PCIe ports 401 and the PCIe interfaces 306. Moreover, the PCIe-SW 107 is coupled to the PCI-express standard adaptors 451 and the dedicated adaptors 452 via slots 462. The adaptor rack 461 includes the plurality of slots 462 for mounting the plurality of adaptors. The adaptor rack 461 is arranged in a housing (not shown) storing the plurality of servers 102, for example. The dedicated adaptor 452 is coupled directly or via the backup network switch 1030 to the management server 101. The adaptors 451 and the management server coupling adaptors 452 may be stored in the adaptor rack 461, or the adaptors 451 and the dedicated adaptors 452 may be directly coupled to the PCIe-SW 107.

Moreover, at least one of the plurality of dedicated adaptors 452 is coupled via the dedicated line 160 to the management server 101.

Figure 5A:
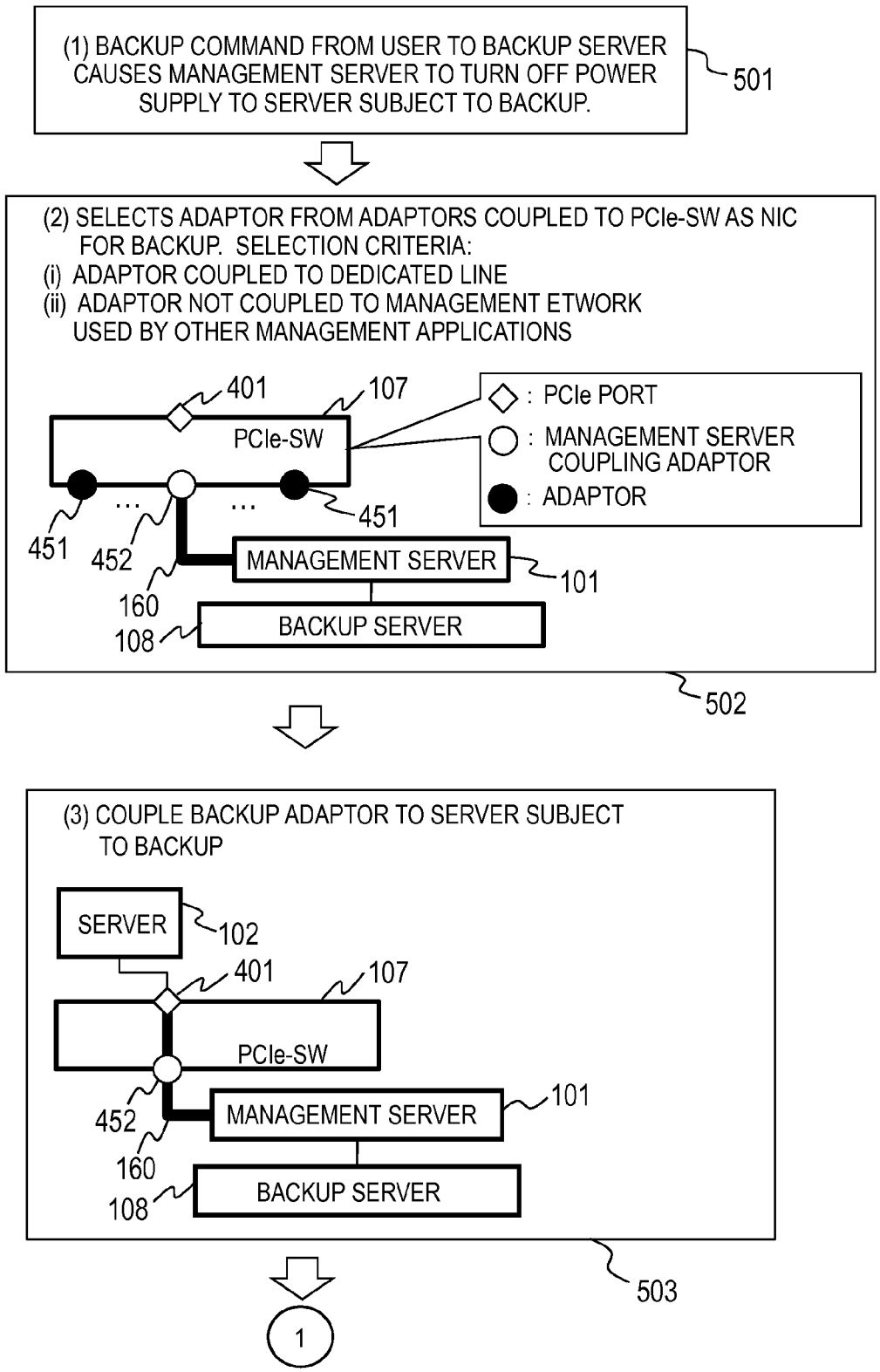
FIG. 5A is the first part of the flowchart of processing of the computer system according to the first embodiment of this invention.
Figure 5B:
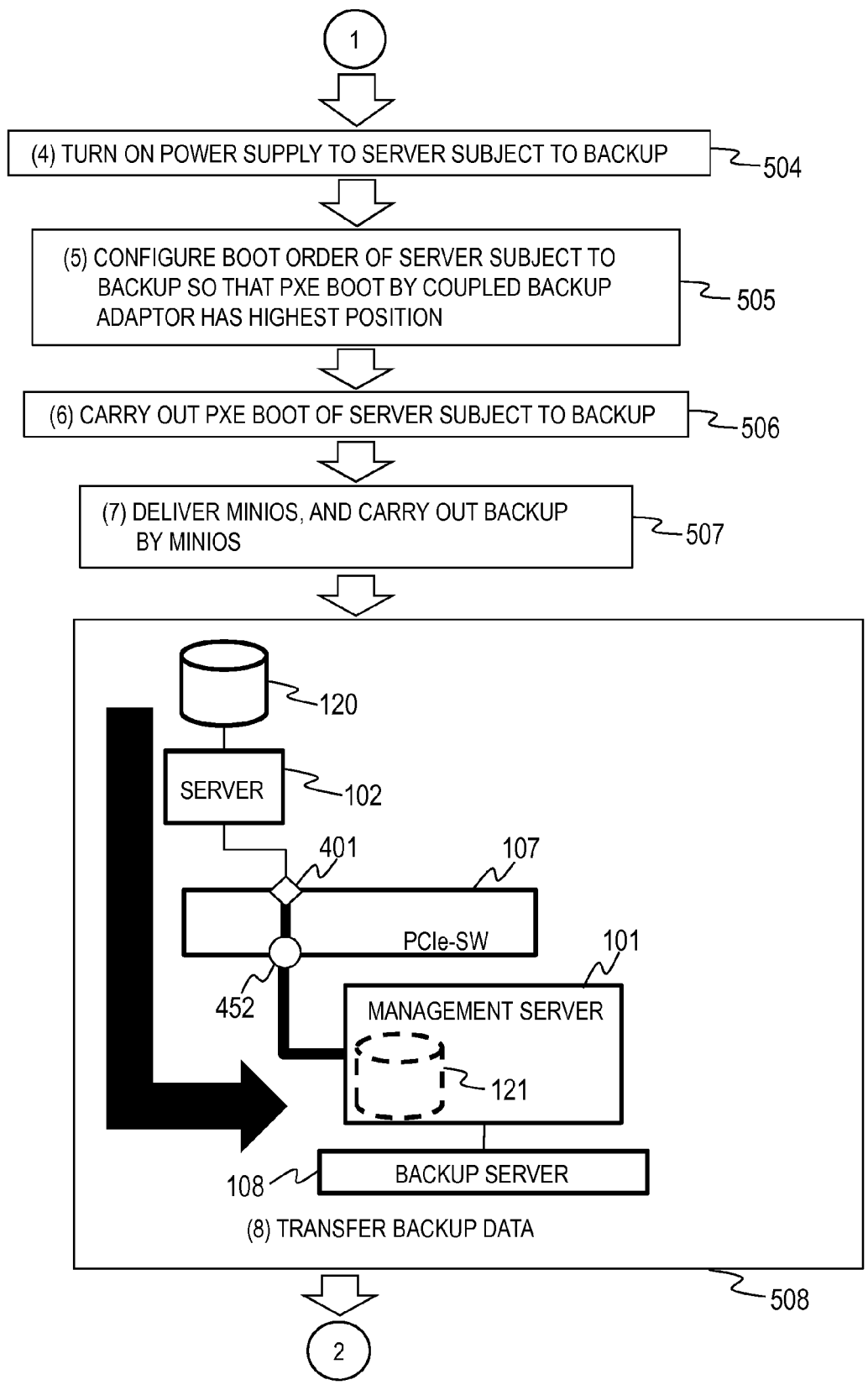
FIG. 5B is a middle part of the flowchart of processing of the computer system according to the first embodiment of this invention.
Figure 5C:
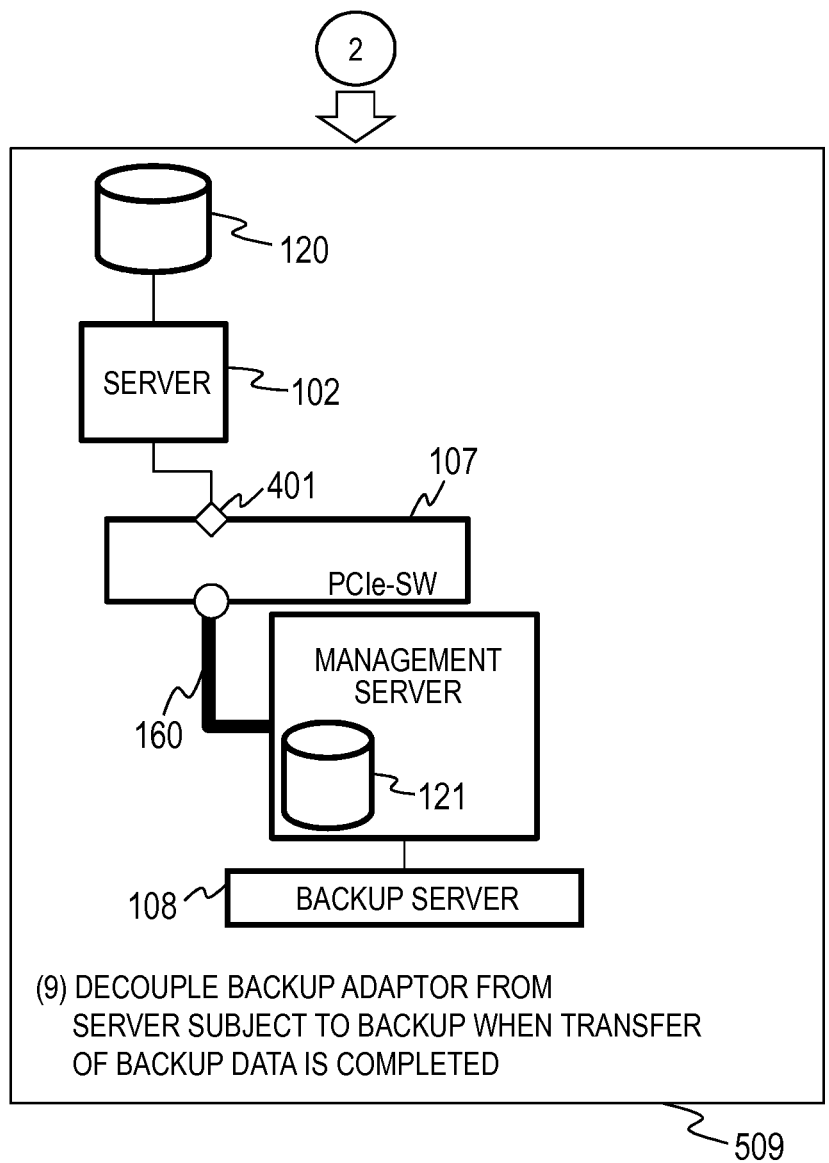
FIG. 5C is a last part of the flowchart of processing of the computer system according to a first embodiment of this invention.

FIGS. 5A, 5B, and 5C illustrate a flowchart of an overview of processing of this embodiment. It should be noted that FIG. 5A illustrates a first part of the flowchart, FIG. 5B illustrate a middle part of the flowchart, and FIG. 5C illustrates a last part of the flowchart. The command of backup is input from the management terminal (not shown) or an input apparatus (not shown) of the backup server 108 by the user (or the administrator).

(1) A backup command from the user to the backup server 108 causes the backup server 108 to notify the management server 101 of which is the server 102 subject to backup. The management server 101 turns off a power supply to the server 102 subject to backup.

(2) The management server 101 selects a dedicated adaptor 452 that is coupled via the dedicated line 160 to the management server 101, and is not coupled to the management network used by other management applications as a backup adaptor from among the adaptors coupled to the PCIe-SW 107. It should be noted that the backup adaptor is an NIC compliant with the preboot execution environment (PXE) boot.

(3) The management server 101 issues a command to the PCIe-SW 107 to couple the dedicated adaptor 452 selected as the backup adaptor, and the PCIe port 401 is coupled to the server 102 subject to backup, thereby building a communication path dedicated for the backup between the server 102 subject to backup and the management server 101 via the dedicated line 160.

(4) The management server 101 turns on the power supply to the server 102 subject to backup, thereby starting up the server 102. The server 102 subject to backup makes access to the PCIe-SW 107, and adds the dedicated adaptor 452 selected as the backup adaptor to a PCI device tree.

(5) The management server 101 configures a boot order (order configuration for boot devices) of the server 102 subject to backup so that the dedicated adaptor 452, which is the backup adaptor, has the highest position. The boot order can be configured by means of, for example, a basic input/output system (BIOS) or a unified extensible firmware interface (UEFI) of the server 102.

(6) The management server 101 carries out the PXE-boot of the server 102 subject to backup. On this occasion, the management server 101 functions as a PXE server and a DHCP server. The server 102 subject to backup acquires an IP address from the management server 101, and transmits a PXE request to the management server 101.

(7) When the management server 101 receives the PXE request from the server 102 subject to backup, the management server 101 delivers a miniOS to the server 102. The server 102 subject to backup downloads the miniOS 300 from the management server 101 by following a procedure for the PXE boot, and starts up the miniOS 300. The miniOS 300 is provided with a backup function in advance.

(8) The miniOS 300 of the server 102 subject to backup transfers the data 120 of the server 102 via the dedicated backup path to the management server 101, and stores the data 120 as the backup data 121 in the management server 101.

(9) Completion of the transfer of the backup data 121 from the server 102 subject to backup causes the management server 101 to issue a command to the PCIe-SW 107 to decouple the dedicated adaptor 452 serving as the backup adaptor and the PCIe port 401 is coupled to the server 102 subject to backup from each other.

It should be noted that the command to turn off the power supply to the server 102 in Step (1), and Steps (4), (5), and (6) can be omitted if the backup can be carried out while the power supply to the server 102 subject to backup is turned on (hot-add and hot-remove are available). The decoupling of the dedicated adaptor 452 in Step (9) can be omitted depending on the type of the miniOS 300.

As a result of the above-mentioned procedure, the management server 101 can carry out the backup of the data 120 of the server 102 by switching to the dedicated path for the backup without using the management network (NW-SW 103). It should be noted that after the management server 101 acquires the backup data 121 of the server 102, the management server 102 writes and saves the backup data 121 to and in a volume 125 for backup of the storage subsystem 105.

FIG. 6 shows the server/PCIe port management table 221. The server/PCIe port management table 221 stores correspondence information on port numbers of the PCIe-SW 107 assigned to the respective servers 102, and configuration information on the servers 102.

In FIG. 6, a column 601 stores identifiers of the server 102, and the identifier is used to uniquely identify each of the servers. An input of data to be stored in the column 601 can be omitted by specifying any one of or a combination of a plurality of columns used in this table. Moreover, the identifiers of the servers 102 may be automatically assigned by the management server 101, for example, in an ascending order.

A column 602 stores the port numbers of the PCIe-SW 107 assigned to the respective servers 102. The port number of the PCIe-SW 107 is unique in the PCIe-SW 107.

A column 603 stores data capacities of the storage subsystem 105 assigned to the respective servers 102.

A column 604 stores models of the servers 102. The model is information on an infrastructure, and is information providing knowledge on makers, performances, and system limits that can be configured of the servers 102. Further, the model is information providing knowledge on whether or not the configuration is the same as that of another server.

A column 605 stores the configurations of the servers 102. As information on the configurations, the column 605 stores architectures of processors, physical location information on a chassis and slots, and characteristic functions (presence/absence of symmetric multi-processing (SMP) between blades, a high availability (HA) configuration, and the like).

A column 606 stores performance information on the servers. As the performance information, the column 606 can store an operation frequency and the number of cores of a processor, a capacity of a memory, the capacity and a type of the assigned storage subsystem 105, and performances of I/O devices.

FIG. 7 shows the intra-PCIe switch device management table 222. The intra-PCIe switch device management table 222 stores information on each correspondence between the PCIe port number of the PCIe-SW 107 and the PCIe slot 462, and information on the adaptors inserted into the PCIe slots.

A column 701 stores the PCIe port numbers. The PCIe port number serves as a main key of the intra-PCIe switch device management table 222.

A column 702 stores PCIe slot numbers. The PCIe slot number is configured to be a unique number in the PCIe-SW 107.

A column 703 (columns 711 to 713) stores information on the adaptors 451 and the dedicated adaptors 452. The column 711 stores device types. As the device types, host bus adaptors (HBAs), NICs, converged network adaptors (CNAs), and the like are stored. The column 712 stores specification information on (transfer speeds of) the devices. The column 713 stores WWNs, which are identifiers of the HBAs, and MAC addresses, which are identifiers of the NICs.

A column 704 stores information on the NW-SWs 103 and 104 or the FC-SW 511 to which the adaptors 451 and the dedicated adaptor 452 are coupled. In the information in the column 704, identifiers of the switches, types of the switches, the coupled ports, and security configuration information are stored.

Figure 8:
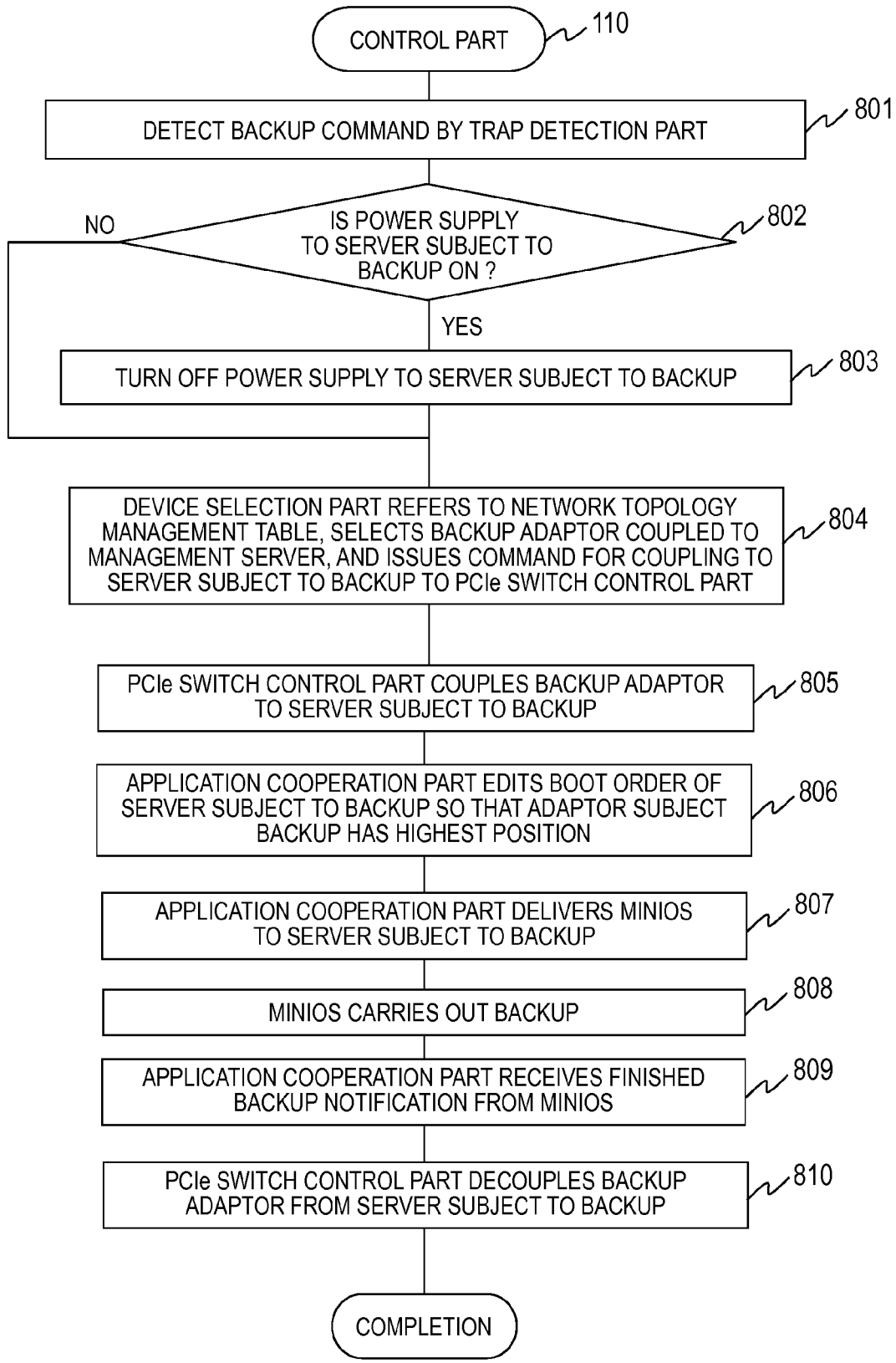
FIG. 8 is a flowchart illustrating an example of processing carried out by the control part of the management server according to a first embodiment of this invention.

FIG. 8 is a flowchart illustrating an example of processing carried out by the control part 110 of the management server 101.

In Step 801, the trap detection part 212 (refer to FIG. 9) detects a backup command from the backup server 108. When the trap detection part 212 detects the backup command, the processing proceeds to Step 802. It should be noted that the trap detection part 212 detects the identifier or the like of the server 102 subject to backup from the backup command.

In Step 802, the control part 110 determines whether the server 102 subject to backup is started up (a power supply is turned on) or not. When the power supply to the server 102 subject to backup is turned on, the processing proceeds to Step 803. Then, the control part 110 turns off the power supply to the server 102 subject to backup, and the processing proceeds to Step 804. When the power supply to the server 102 subject to backup is turned off, the processing proceeds to Step 804.

In Step 804, the device selection part 211 (FIG. 10) refers to the network topology management table 223 to select the dedicated adaptors 452 coupled to the management server 101 via networks, and also coupled to the PCIe-SW 107, and selects the backup adaptor out thereof. The device selection part 211 outputs a command to couple the selected backup adaptor to the server 102 subject to backup to the PCIe switch control part 214.

In Step 805, the PCIe switch control part 214 (FIG. 11) receives the command from the device selection part 211, and instructs the PCIe-SW 107 to couple the PCIe port 401 to which the server 102 subject to backup is coupled and the slot 462 mounting the backup adaptor. The PCIe-SW 107 receives the command, and configures a path coupling the PCIe port 401 for coupling to the server 102 subject to backup and the slot 462 for the backup adaptor to each other.

In Step 806, the management part 110 turns on the power supply to the server 102 subject to backup, thereby starting up the server 102 subject to backup. The server 102 subject to backup makes access to the PCIe-SW 107, and adds the dedicated adaptor 452 selected as the backup adaptor to the PCI device tree.

Further, the application cooperation part 213 (FIG. 12) configures the boot order (order configuration for boot devices) of the server 102 subject to backup so that the backup adaptor has the highest position. The boot order for the boot devices can be configured by means of, for example, the BIOS or the UEFI of the server 102 as described above.

In Step 807, the control part 111 of the management server 101 carries out the PXE boot for the server 102 subject to backup. On this occasion, the management server 101 functions as a PXE server and a DHCP server. The server 102 subject to backup acquires an IP address from the management server 101, and transmits a PXE request to the management server 101. When the management server 101 receives the PXE request from the server 102 subject to backup, the management server 101 delivers the miniOS to the server 102. The server 102 subject to backup downloads the miniOS 300 from the management server 101 by following the procedure for the PXE boot, and starts up the miniOS. The miniOS 300 is provided with the backup function in advance as described above.

In Step 808, the miniOS 300 carries out the backup. The miniOS 300 transfers the data 120 of the server 102 via the backup dedicated path to the management server 101, and stores the data 120 as the backup data 121 in the management server 101.

In Step 809, the application cooperation part 213 receives a finished backup notification from the miniOS 300.

In Step 810, the PCIe switch control part 214 transmits a command to the PCIe-SW 107 to decouple the dedicated adaptor 452 selected as the backup adaptor and the PCIe port 401 is coupled to the server 102 subject to backup from each other, and finishes the processing.

It should be noted that, as described above, Step 810 may be omitted if the backup adaptor can be maintained to be coupled to the server 102 subject to backup.

Figure 9:
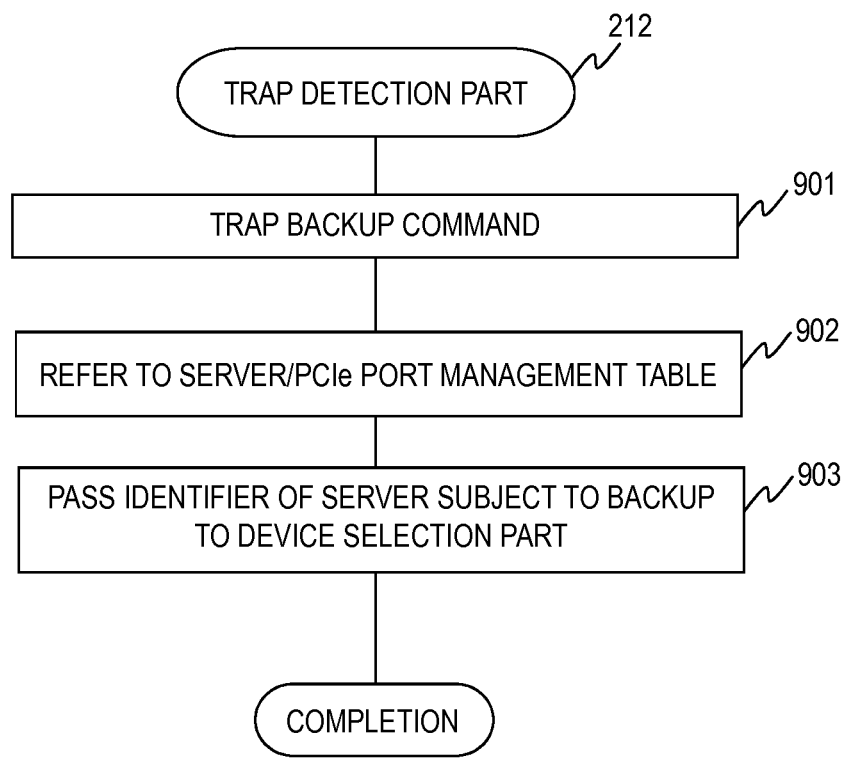
FIG. 9 is a flowchart illustrating an example of processing carried out by the trap detection part of the management server according to a first embodiment of this invention.

FIG. 9 is a flowchart illustrating an example of processing carried out by the trap detection part 212 of the management server 101.

In Step 901, the trap detection part 212 traps the backup command transmitted by the backup instruction part 112 of the backup server 108 to the management server 101.

In Step 902, the trap detection part 212 acquires the identifier of the server from the backup command, and refers to the server/PCI port management table 221 in order to identify the server 102 subject to backup.

In Step 903, the server identifier and the PCIe port number of the server 102 subject to backup are passed to the device selection part 211. The device selection part 211 can provide the PCIe switch control part 214 with an instruction on a path between the PCIe port and the backup adaptor.

Figure 10:
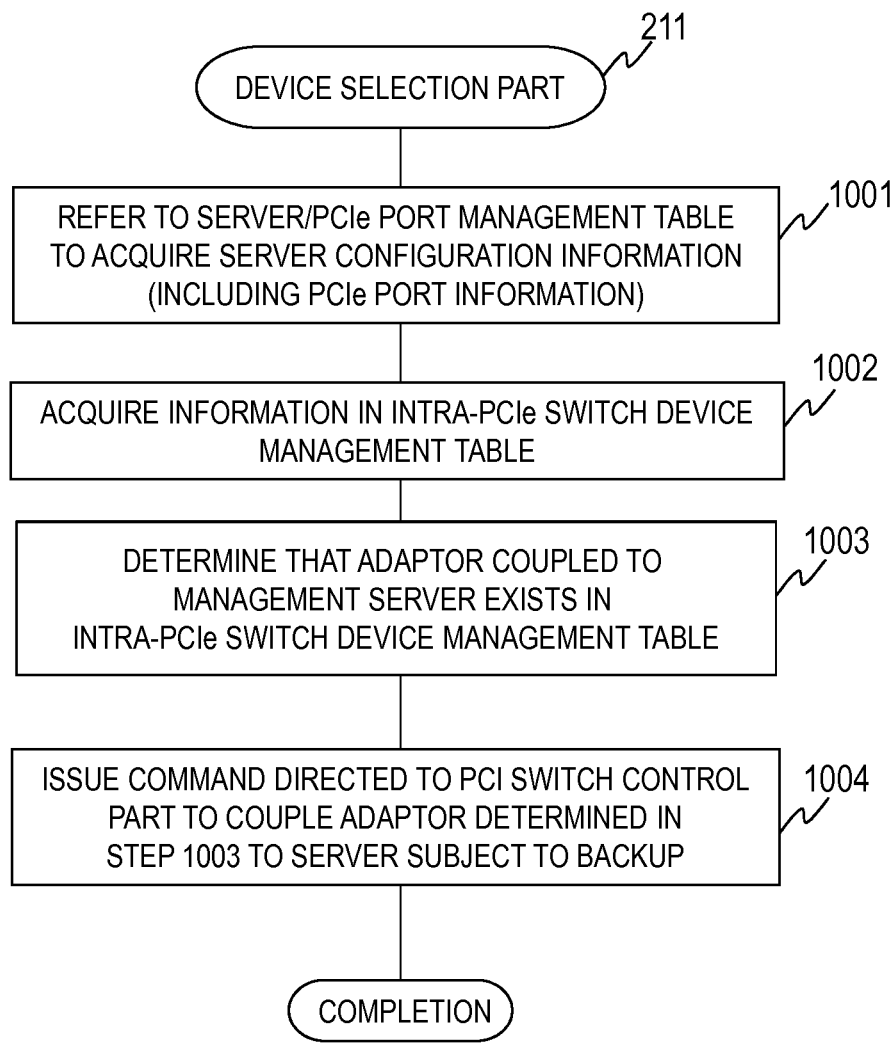
FIG. 10 is a flowchart illustrating an example of processing carried out by the device selection part of the management server according to a first embodiment of this invention.

FIG. 10 is a flowchart illustrating an example of processing carried out by the device selection part 211 of the management server 101.

In Step 1001, the device selection part 211 searches the server/PCIe port management table 221 based on the server identifier passed from the trap detection part 212, and acquires configuration information on the server 102 subject to backup.

In Step 1002, the device selection part 211 refers to the intra-PCIe switch device management table 222, and the processing proceeds to Step 1003.

In Step 1003, the device selection part 211 determines that an adaptor coupled to the management server 101 exists in the intra-PCIe switch device management table 222. In this processing, if the management server 101 and the PCIe-SW 107 are directly coupled to each other, and a device 711 equal in the MAC address in the column 713 to the network interface 204 of the management server 101 exists, the device selection part 211 can determine that the adaptor coupled to the management server 101 exists. Moreover, even if the management server 101 and the PCIe-SW 107 are not directly coupled to each other, the device selection part 211 can determine that the adaptor coupled to the management server 101 via the network exists based on the switch information in the column 704. Then, the device selection part 211 acquires the slot number of the backup adaptor and the number of the PCIe port to which the management server 101 is coupled.

In Step 1004, the device selection part 211 issues a command directed to the PCIe switch control part 214 to couple the backup adaptor determined in Step 1003 to the PCIe port of the server 102 subject to backup.

Figure 11:
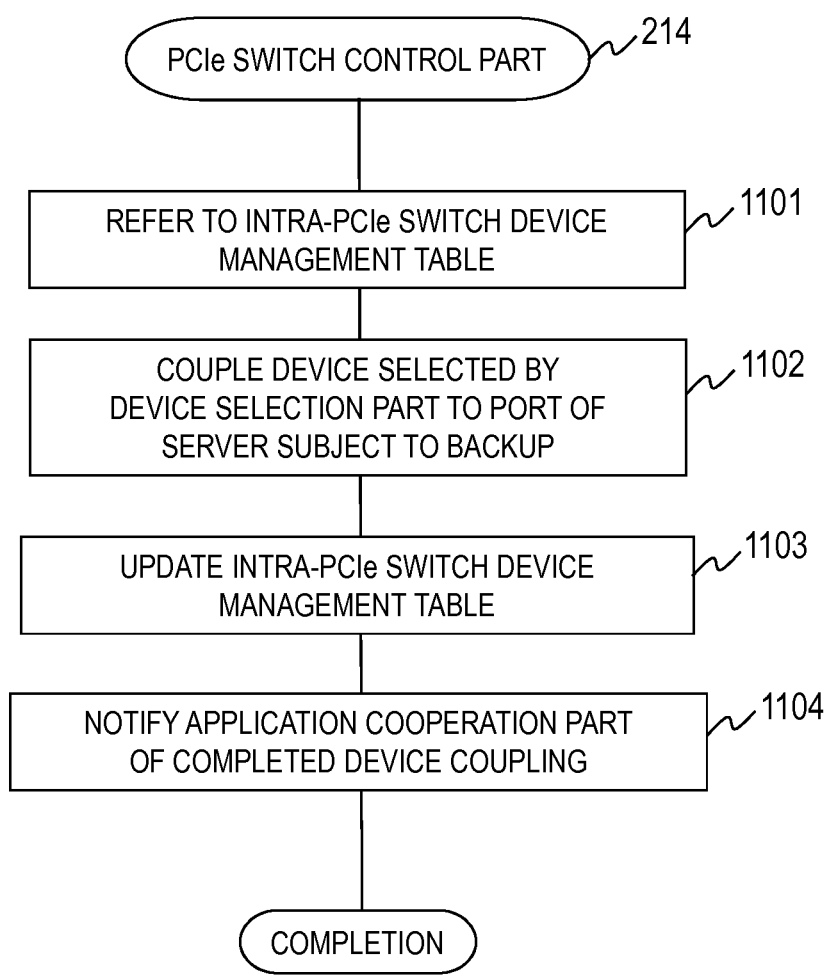
FIG. 11 is a flowchart illustrating an example of processing carried out by the PCIe switch control part of the management server according to a first embodiment of this invention.

FIG. 11 is a flowchart illustrating an example of processing carried out by the PCIe switch control part 214 of the management server 101.

In Step 1101, the PCIe switch control part 214 refers to the intra-PCIe switch device management table 222.

In Step 1102, the PCIe switch control part 214 couples the adaptor selected by the device selection part 211 to the PCIe port 401 is coupled to the server 102 subject to backup.

In Step 1103, the PCIe switch control part 214 updates the intra-PCIe switch device management table 222.

In Step 1104, the PCIe switch control part 214 notifies the application cooperation part 213 of the completed coupling of the backup adaptor.

FIG. 12 is a flowchart illustrating an example of processing carried out by the application cooperation part 213 of the management server 101.

In Step 1201, the application cooperation part 213 receives the completed coupling notification for the backup adaptor from the PCIe switch control part 214.

In Step 1202, the application cooperation part 213 configures the boot order of the server 102 subject to backup so that the backup adaptor has the highest position.

In Step 1203, the application cooperation part 213 delivers the miniOS 300 to the server 102 subject to backup. On the server 102 subject to backup, the miniOS 300 is executed to carry out the backup for the data 120, and transmits the backup data 121 via the dedicated line 160 to the management server 101.

In Step 1204, when the backup is completed, the application cooperation part 213 receives a completed backup notification from the miniOS 300.

In Step 1205, the application cooperation part 213 outputs an instruction to the PCIe switch control part 214 to decouple the backup adaptor from the server 102 subject to backup.

If the backup adaptor can be maintained to be coupled to the server subject to backup, Step 1205 may be omitted. It should be noted that after the management server 101 acquires the backup data 121 of the server 102, the management server 101 writes and saves the backup data 121 to and in the volume 125 for backup of the storage subsystem 105.

As a result of the above-mentioned processing, the management server 101 can carry out the backup of the data 120 of the server 102 by means of the backup adaptor and the dedicated line 160. As a result, a used bandwidth amount of the management network (NW-SW) 103 can be reduced, and management information transmitted via the management network (NW-SW) 103 by the management program 322 or the like can be prevented from being retransmitted, and hence smooth operation of the computer system can be achieved.

According to this embodiment, such an example that this invention is applied to the backup has been described, but this invention may be used for a transfer of data between the management server 101 and the server 102. For example, for recovery or deployment where data is transferred from the management server 101 to the server 102, the dedicated adaptor 452 can be used.

FIG. 15 shows an example of the network topology management table 223. The network topology management table 223 stores correspondence information on the servers 102 coupled to the management network NW-SWs 103, the business task network NW-SWs 104, the backup network switches 1030, or the like. Moreover, the network topology management table 223 also stores past used bandwidth amounts of the network switches.

A column 1501 stores names or identifiers of the NW-SWs 103 or the backup network switches 1030. A column 1502 stores servers identifiers of servers coupled to the NW-SWs 103 or the backup network switches 1030. A column 1503 stores names or identifiers of network switches and I/O adaptors to which the servers having the server names or identifiers stored in the column 1502 are coupled via the network switches having the names or identifiers stored in the column 1501. A column 1504 stores past used bandwidth amounts of the respective network switches.

It should be noted that the network topology management table 223 may be generated and updated by the network information acquisition part 215 at a predetermined cycle, for example, or may be generated and updated by the administrator or the like.

<Second Embodiment>

According to the first embodiment, in Step 803 of FIG. 8, the processing for turning off the power supply to the server 102 subject to backup is carried out, but the backup can be carried out while the power supply to the server 102 subject to backup is turned on by using a backup application that does not use the network boot.

Figure 25:
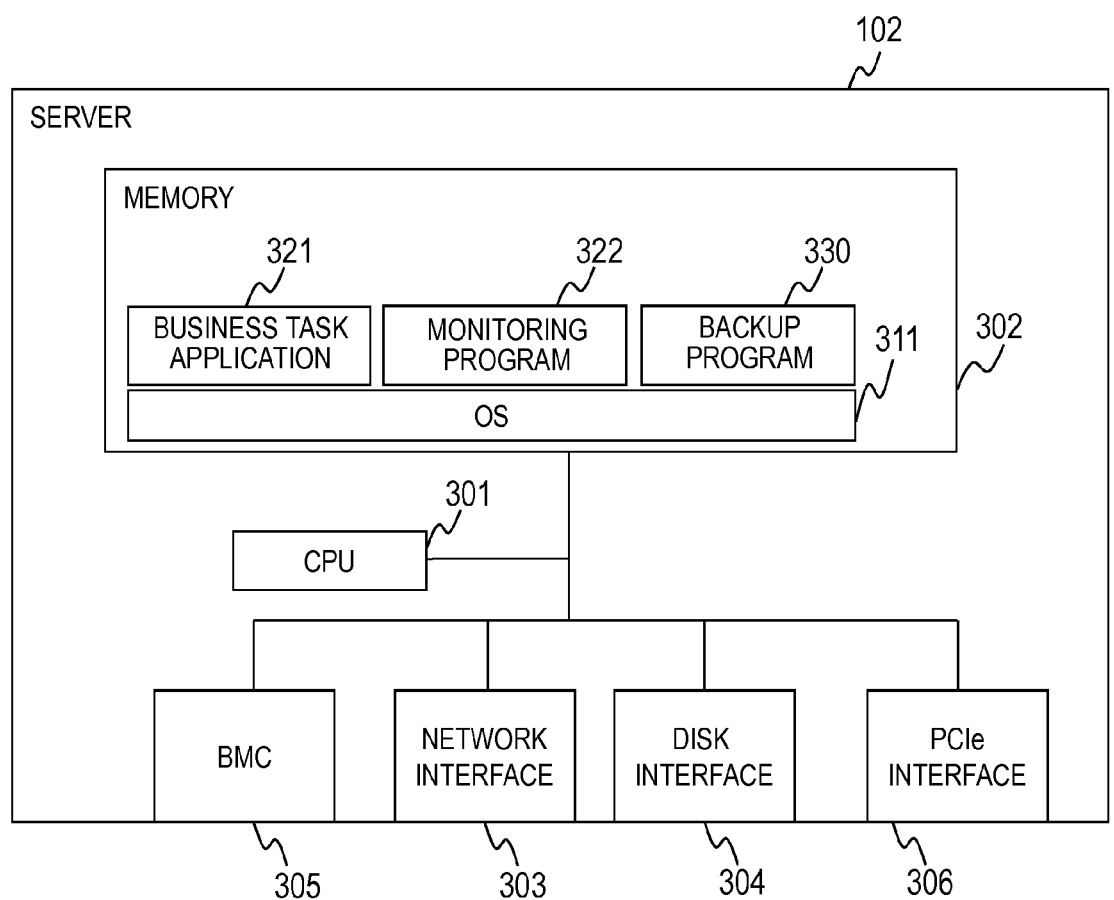
FIG. 25 is a block diagram illustrating an example of the server according to the second embodiment.

The configuration of a computer system used in a second embodiment of this invention is the same as that of FIG. 1 according to the first embodiment. FIG. 25 is a block diagram illustrating an example of the server 102 according to the second embodiment. In FIG. 25, such a point that a backup program 330 is executed on the server 102 is different from the first embodiment, and the rest is the same as the first embodiment.

FIG. 13 is a flowchart illustrating an example of processing carried out by the control part 110 according to the second embodiment.

In Step 1301, as in Step 801 of FIG. 8 according to the first embodiment, the trap detection part 212 (refer to FIG. 9) detects the backup command from the backup server 108. When the trap detection part 212 detects the backup command, the processing proceeds to Step 1302. It should be noted that the trap detection part 212 detects the identifier or the like of the server 102 subject to backup from the backup command.

In Step 1302, as in Step 804 of FIG. 8, the device selection part 211 (FIG. 10) selects the backup adaptor out of the dedicated adaptors 452 coupled to the PCIe-SW 107. The device selection part 211 outputs the command to couple the selected backup adaptor to the server 102 subject to backup to the PCIe switch control part 214.

In Step 1303, as in Step 805 of FIG. 8, the PCIe switch control part 214 (FIG. 11) receives the command from the device selection part 211, and instructs the PCIe-SW 107 to couple the PCIe port 401 to which the server 102 subject to backup is coupled and the slot 462 mounting the backup adaptor. The PCIe-SW 107 receives the command, and configures the path coupling the PCIe port 401 for coupling to the server 102 subject to backup and the slot 462 for the backup adaptor to each other.

In Step 1304, the application cooperation part 213 (FIG. 14) transmits an instruction to start the backup to the backup program 330.

In Step 1305, the backup program 330 carries out the backup. The backup program 330 transfers the data 120 of the server 102 subject to backup to the management server, and completes the backup.

In Step 1306, the application cooperation part 213 (FIG. 14) receives a finished backup notification from the backup program 330, which has completed the backup.

In Step 1307, as in Step 801 of FIG. 8 according to the first embodiment, the PCIe switch control part 214 transmits the command to the PCIe-SW 107 to decouple the dedicated adaptor 452 selected as the backup adaptor and the PCIe port 401 is coupled to the server 102 subject to backup from each other, and finishes the processing.

It should be noted that Step 1307 may be omitted if the backup adaptor can be maintained to be coupled to the server subject to backup.

FIG. 14 is a flowchart illustrating an example of processing carried out by the application cooperation part 213 according to the second embodiment.

In Step 1401, as illustrated in FIG. 11 according to the first embodiment, the application cooperation part 213 receives the completed coupling notification for the backup device from the PCIe switch control part 214.

In Step 1402, the application cooperation part 213 instructs the server 102 subject to backup to carry out the backup of the server 102 by using the backup program 330.

In Step 1403, the application cooperation part 213 receives a completed backup notification from the backup program 330.

In Step 1404, the application cooperation part 213 instructs the PCI switch control part 214 to decouple the backup adaptor.

It should be noted that Step 1404 may be omitted if the backup adaptor can be maintained to be coupled to the server 102 subject to backup.

As described above, according to the second embodiment, if the power supply to the server 102 subject to backup cannot be turned off by means of network boot as in the first embodiment due to an influence of a business task or the like, the backup program 330 can be executed on the server 102 to carry out the backup via the dedicated adaptor 452.

<Third Embodiment>

Figure 26:
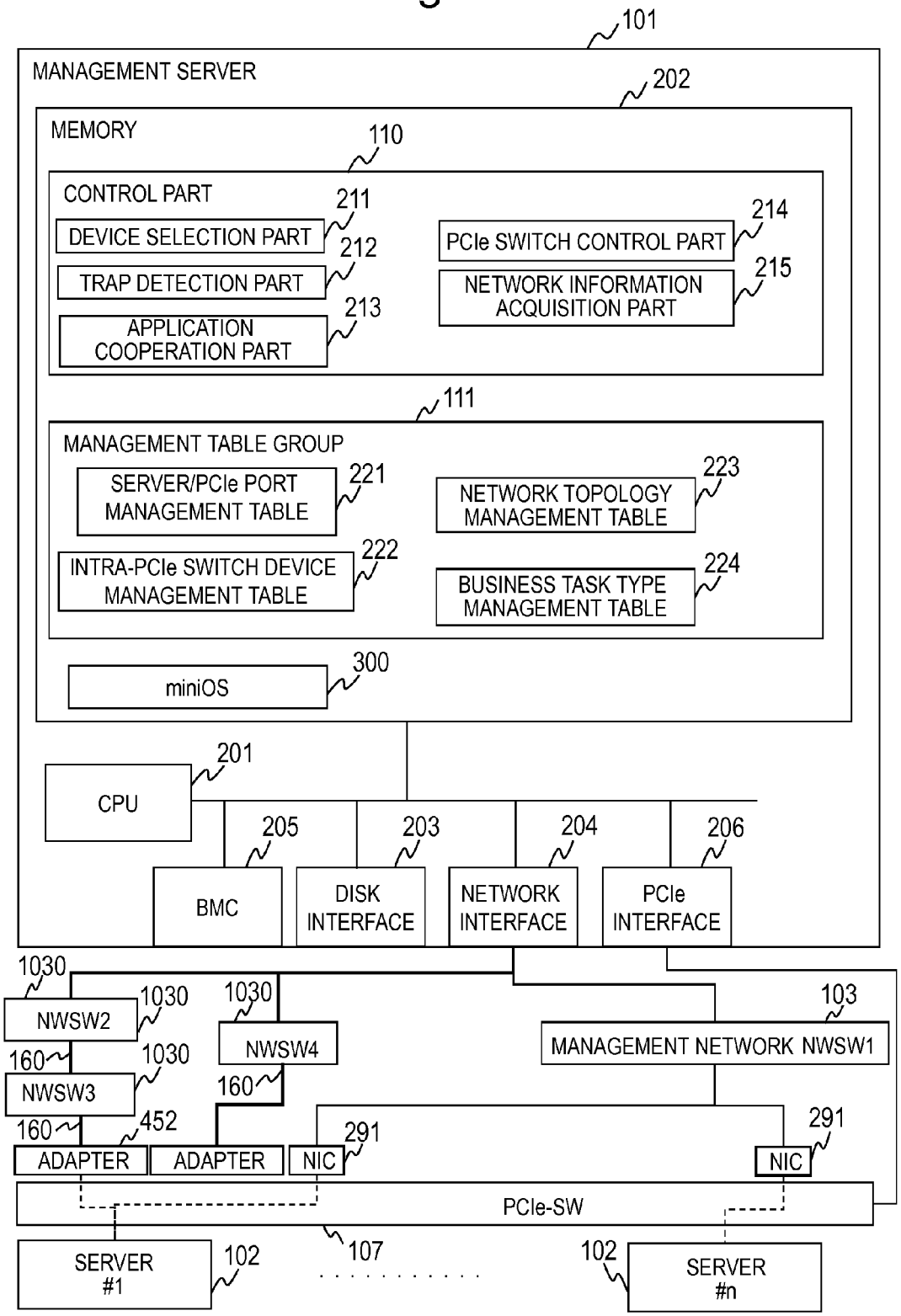
FIG. 26 is a block diagram illustrating the management server according to a third embodiment of this invention.

FIG. 26 is a block diagram illustrating the management server 101 according to a third embodiment of this invention. In FIG. 26, the management server 101 and a plurality of servers 102 are coupled to each other via the management network (NW-SW) 103 and the NICs 291 in the PCIe-SW 107. Moreover, the management server 101 is coupled via a plurality of backup network switches NWSW2 to NWSW4 (1030) and the dedicated lines 160 to the dedicated adaptors 452 of the PCIe-SW 107. Further, the management server 101 is different from the management server 101 of FIG. 2 according to the first embodiment in such a point that the management server 101 includes a business task type management table 234 for managing importance degrees of business tasks of the servers 102.

According to the third embodiment, if the importance degrees (or priorities) exist for the business tasks respectively provided by the plurality of servers 102 subject to management by the management server 101, the management server 101 manages the servers 102 and the business task importance degrees thereof in the business task type management table 234 (refer to FIG. 16). Then, the management server 101 determines a network to be used for the backup by comparing the business task importance degrees of the respective servers 102 during the backup. The network is determined by the management server 101 referring to the network topology management table 223 (refer to FIG. 15).

Figure 17:
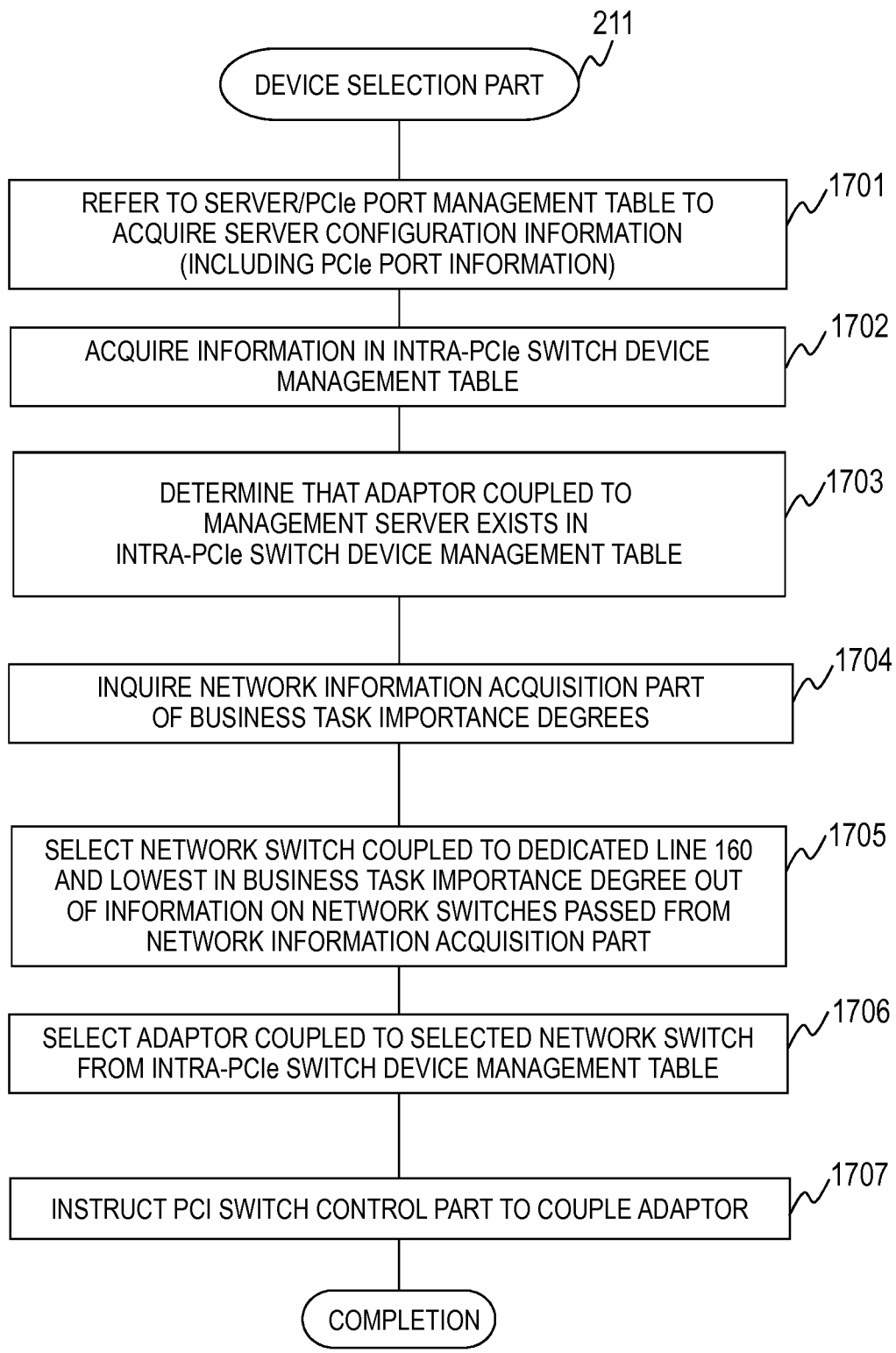
FIG. 17 is a flowchart illustrating an example of processing carried out by the device selection part of the management server according to the third embodiment.

According to the third embodiment, in place of FIG. 10 according to the first embodiment, a processing flowchart carried out by the device selection part 211 illustrated in FIG. 17 is used. The other configuration is the same as that of the first embodiment.

FIG. 17 is a flowchart illustrating an example of processing carried out by the device selection part 211 according to the third embodiment.

In Step 1701, the device selection part 211 searches the server/PCIe port management table 221 based on the server identifier passed from the trap detection part 212 described in the first embodiment (refer to FIG. 6). The device selection part 211 acquires server configuration information on the server 102 subject to backup (including information on the PCIe ports) based on the passed server identifier from the server/PCIe port management table 221.

In Step 1702, the device selection part 211 acquires information in the intra-PCIe switch device management table 222 (refer to FIG. 7).

In Step 1703, the device selection part 211 determines that the adaptor coupled to the management server 101 exists in the intra-PCIe switch device management table 222. In this processing, if the management server 101 and the PCIe-SW 107 are directly coupled to each other, and the device 711 equal in the MAC address in the column 713 to the network interface 204 of the management server 101 exists, the device selection part 211 can determine that the adaptor coupled to the management server 101 exists. Moreover, even if the management server 101 and the PCIe-SW 107 are not directly coupled to each other, the device selection part 211 can determine that the adaptor coupled to the management server 101 via the network exists based on the switch information in the column 704. Then, the device selection part 211 acquires the slot number of the backup adaptor and the number of the PCIe port to which the management server 101 is coupled.

In Step 1704, the device selection part 211 inquires the network information acquisition part 215 of the importance degree of the business task provided by the server 102.

In Step 1705, the device selection part 211 selects, based on the importance degree of the business tasks from the network information acquisition part 215, a network switch to which the dedicated line 160 is coupled, and is the lowest in importance degree of the business tasks of the coupled servers 102.

In Step 1706, the device selection part 211 selects an adaptor coupled to the network switch selected in Step 1705 from the intra-PCIe switch device management table 222.

In Step 1707, the device selection part 211 transmits an instruction to the PCI switch control part 214 to couple the adaptor selected in Step 1706 to the server 102 subject to backup.

As a result of the above-mentioned processing, a path routing through the backup network switch 1030 lowest in importance degree of the business task on the servers 102 out of the network switches 1030 each coupled to the dedicated line 160 and the dedicated adaptor 452 for backup is coupled to the server 102 subject to backup.

Figure 18:
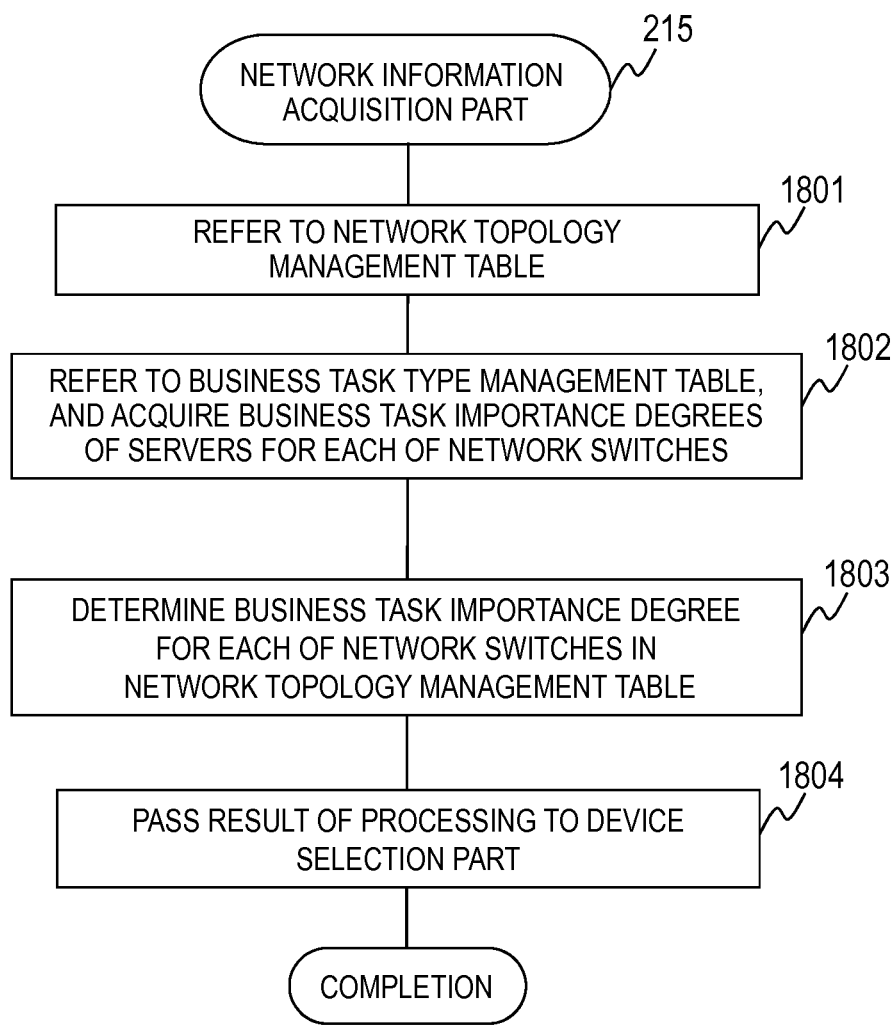
FIG. 18 is a flowchart illustrating an example of processing carried out by the network information acquisition part of the management server according to the third embodiment of this invention.

FIG. 18 is a flowchart illustrating an example of processing carried out by the network information acquisition part 215. It should be noted that the processing is carried out in Step 1704 of FIG. 17.

In Step 1801, the network acquisition part 215 refers to the network topology management table 223 (refer to FIG. 15).

In Step 1802, the network information acquisition part 215 refers to the business task management table 224 (refer to FIG. 16), and acquires the business task importance degrees of the servers for each of the backup network switches 1030.

In Step 1803, the network information acquisition part 215 determines a business task importance degree for each of the backup network switches 1030 in the network topology management table 223. It should be noted that, as calculation of the business task importance degree of each of the backup network switches 1030, the network information acquisition part 215 may acquire an average or a sum of the values of the business task importance degrees 1603 in the business task type management table 224 as the business task importance degree of each of the backup network switches 1030. On this occasion, the business task importance degree 1603 of the business task type management table 224 may be configured such that "A"=3, "B"=2, and "C"=1, and "A" has the highest value.

In Step 1804, the network information acquisition part 215 passes the business task importance degree of each of the network switches to the device selection part 211.

FIG. 16 shows the business task type management table 234. The business task type management table 234 stores information on business task applications 321 operating on each of the servers 102, and information on an operation schedule of each of the servers 102.

A column 1601 stores server identifiers. A column 1602 stores business task types of the business task applications 321. The business task application 321 may be operated on a plurality of servers, or the same business task systems are built on independent servers, and thus, the business task type may not be unique.

A column 1603 stores importance degrees of the business task applications 321. A higher performance of the server needs to be guaranteed for the high importance degree (A) compared with the low importance degree (C.).

A column 1604 stores the operation schedules of the business task applications 321. In a time period of the operation schedule, the business task application 321 on the server 102 is operated. A column 1605 stores past used bandwidth amounts (bandwidths of networks) of the business task applications 321.

As described above, according to the third embodiment, the influence of the network bandwidth consumption by the backup can be restrained to be low by avoiding a network high in importance degree of the business task application 321 during the backup.

<Fourth Embodiment>

A fourth embodiment of this invention is an example where the management server 101 compares the number of other servers 102 coupled to the network switch 1030 coupled to the backup dedicated line 160 and the number of other servers 102 coupled to the network switch 103 to which the server 102 subject to backup is coupled with each other in the configuration of FIG. 26 of the third embodiment, and selects a network switch smaller in number of coupled servers as a server for backup. The system configuration according to the fourth embodiment is the same as that according to the third embodiment illustrated in FIG. 26.

Figure 19:
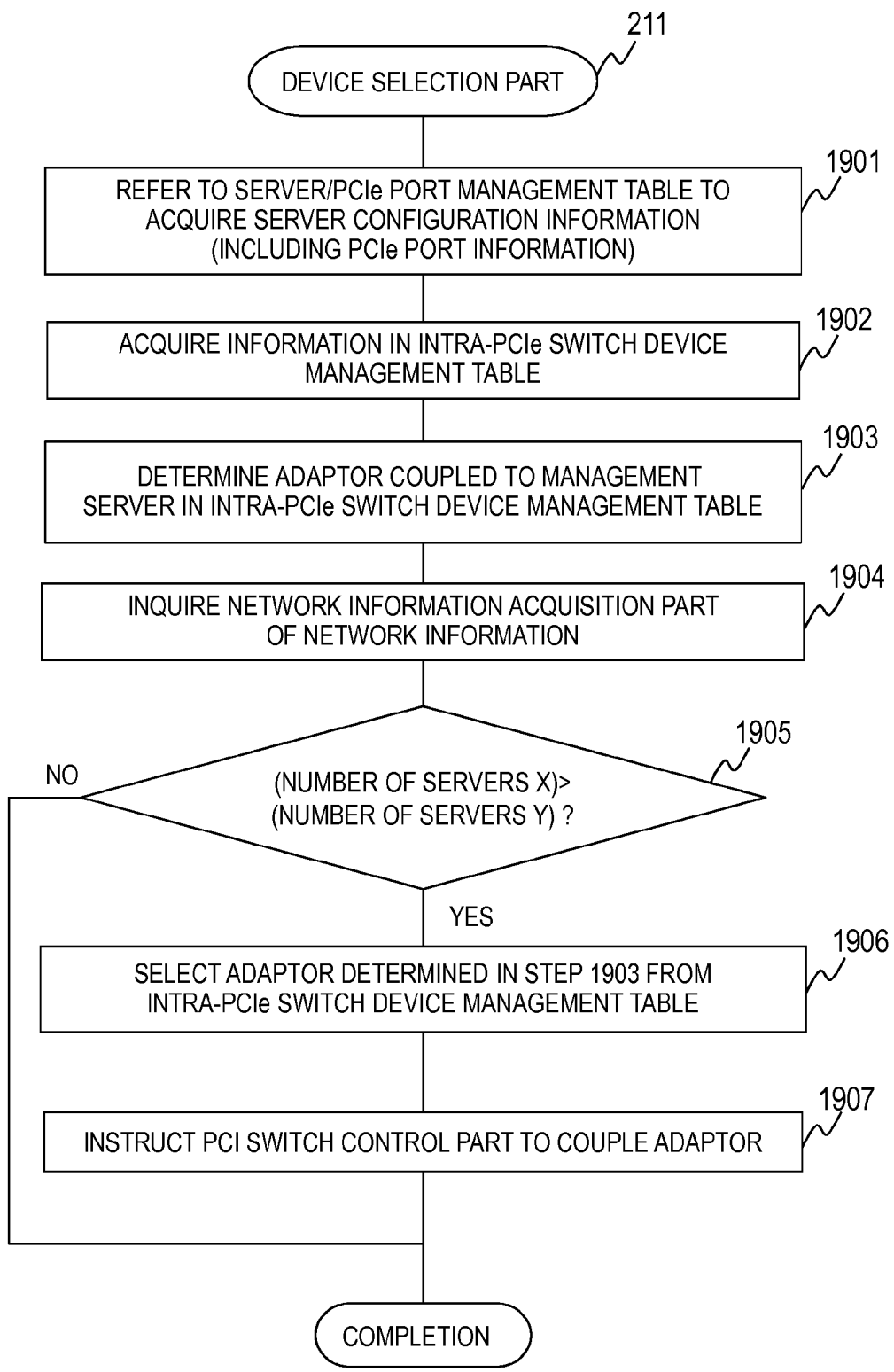
FIG. 19 is a flowchart illustrating an example of processing carried out by the device selection part of the management server according to a fourth embodiment of this invention.
Figure 20:
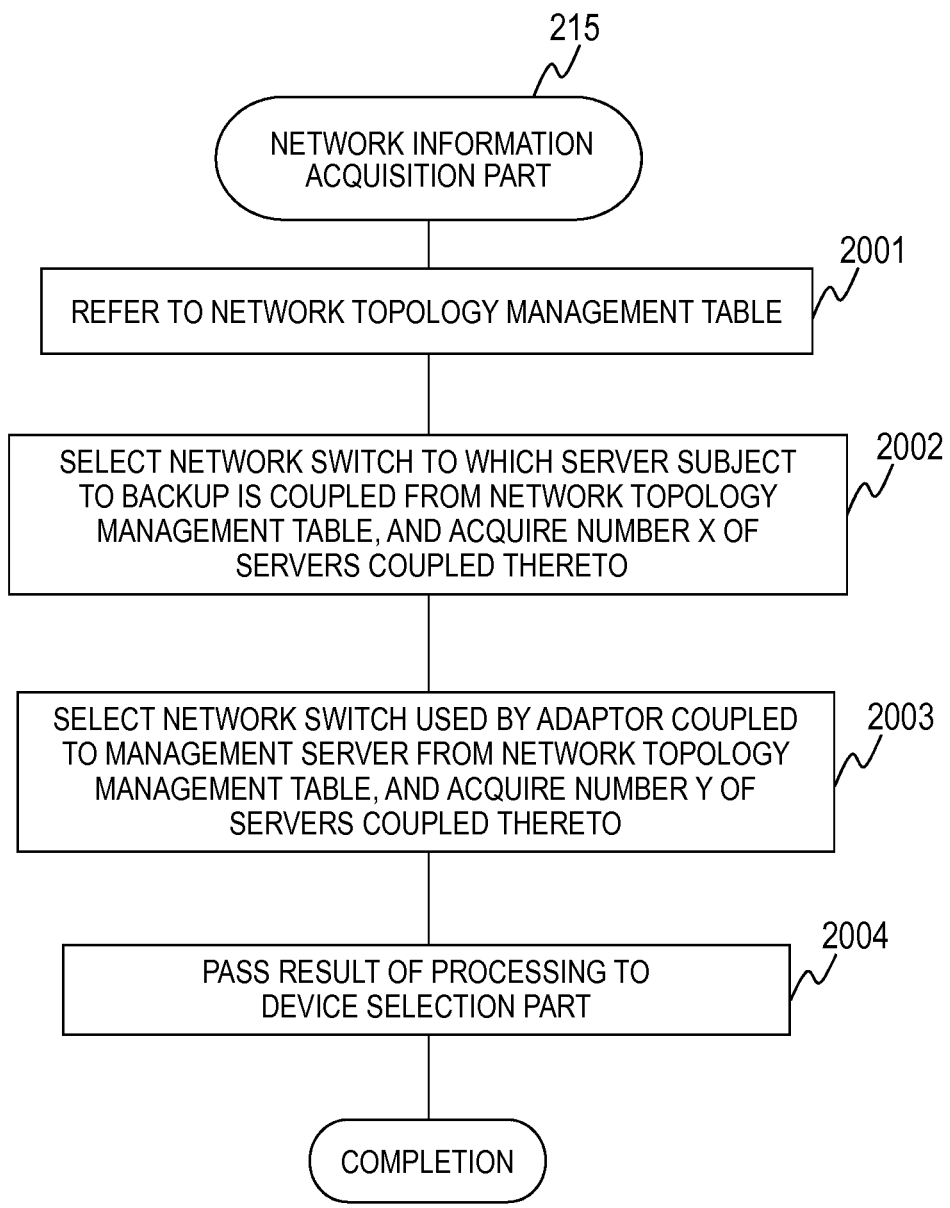
FIG. 20 is a flowchart illustrating an example of processing carried out by the network information acquisition part of the management server according to the fourth embodiment of this invention.

According to the fourth embodiment, as the processing carried out by the device selection part 211, in place of FIG. 10 according to the first embodiment, a flowchart for the device selection part 211 illustrated in FIG. 19 is used. Moreover, in place of FIG. 18 according to the third embodiment, a flowchart for the network information acquisition part 215 illustrated in FIG. 20 is used.

FIG. 19 is a flowchart illustrating an example of processing carried out by the device selection part 211 according to the fourth embodiment.

In Step 1901, the device selection part 211 searches the server/PCIe port management table 221 based on the server identifier passed from the trap detection part 212, and acquires the configuration information (601 to 606 of FIG. 6) on the server 102 subject to backup.

In Step 1902, the device selection part 211 refers to the intra-PCIe switch device management table 222. In Step 1903, the device selection part 211 determines an adaptor coupled to the management server 101 in the intra-PCIe switch device management table 222. In this processing, if the management server 101 and the PCIe-SW 107 are directly coupled to each other, and a device 711 equal in the MAC address in the column 713 to the network interface 204 of the management server 101 exists, the device selection part 211 can determine that an adaptor coupled to the management server 101 exists. Moreover, even if the management server 101 and the PCIe-SW 107 are not directly coupled to each other, the device selection part 211 can determine that an adaptor coupled to the management server 101 through the network exists based on the switch information in the column 704. Then, the device selection part 211 acquires the slot number of the backup adaptor, the number of the PCIe port to which the management server 101 is coupled, and the information 703 on the adaptor.

In Step 1904, the device selection part 211 inquires the network information acquisition part 215 of network information. In this processing, as described later referring to FIG. 20, a number X of servers and a number Y of servers are acquired.

In Step 1905, the device selection part 211 compares the number X of servers in Step 2002 (described later) and the number Y of servers in 2003 with each other. It should be noted that the number X of servers is the number of servers coupled to the switch (NW-SW 103) for the management network to which the server 102 subject to backup is coupled. The number Y of servers is the number of servers coupled to the network switch 1030 used by the adaptor of the management server 101. As a result of the comparison, when the number X of the servers is equal to or smaller than the number Y of servers, the steps to be carried out by the device selection part 211 are completed. On the other hand, when the number X of servers is larger than the number Y of the servers, the processing proceeds to Step 1906.

In Step 1906, the device selection part 211 selects the adaptor determined in Step 1903 as a dedicated adaptor 452 from the intra-PCIe switch device management table 222.

In Step 1907, the device selection part 211 instructs the PCI switch control part 214 to couple the dedicated adaptor 452 selected in Step 1906 to the server 102 subject to backup.

FIG. 20 is a flowchart illustrating an example of processing carried out in Step 1904 of FIG. 19 by the network information acquisition part 215.

In Step 2001, the network acquisition part 215 refers to the network topology management table 223 (refer to FIG. 15) illustrated in FIG. 15 according to the first embodiment.

In Step 2002, the network information acquisition part 215 selects the network switch (column 1501) to which the server 102 subject to backup is coupled from the network topology management table 223. Then, the network information acquisition part 215 acquires the number X of servers (number of identifiers in the columns 1502) coupled to the network switch (column 1501).

In Step 2003, the network information acquisition part 215 selects the network switch (column 1501) used by the adaptor coupled to the management server 101 from the network topology management table 223. Then, the network information acquisition part 215 acquires the number Y of servers (number of identifiers in the columns 1502) coupled to the network switch (column 1501).

In Step 2004, the network information acquisition part 215 passes the number X of servers in Step 2003 and the number Y of servers in Step 2004 to the device selection part 211.

As described above, according to the fourth embodiment, even when the backup causes a failure, or consumes a large quantity of the network bandwidth, the influence on servers 102 independent of the backup can be restrained to the minimum.

<Fifth Embodiment>

Figure 27:
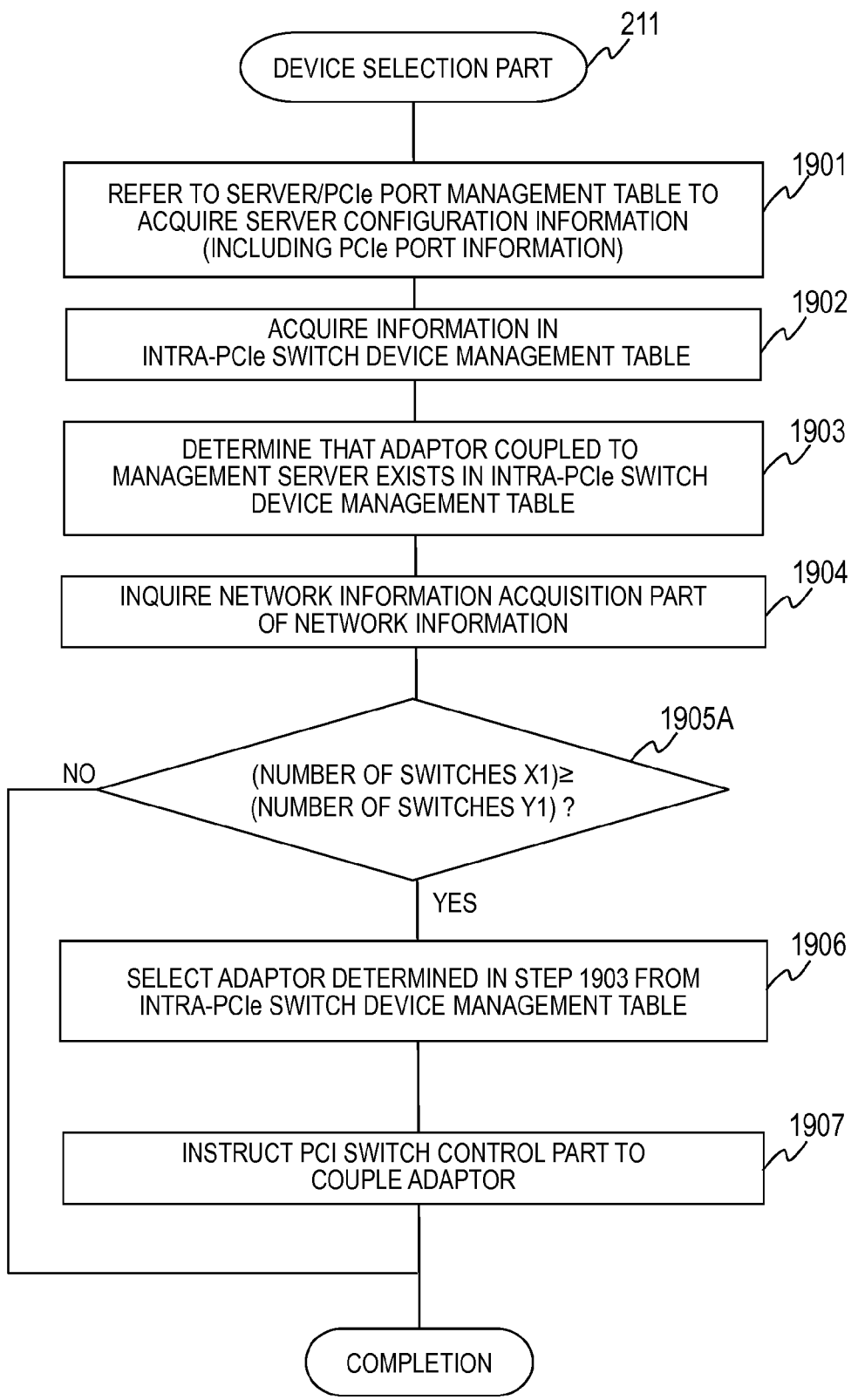
FIG. 27 is a flowchart illustrating an example of processing carried out by the device selection part according to a fifth embodiment of this invention.
Figure 28:
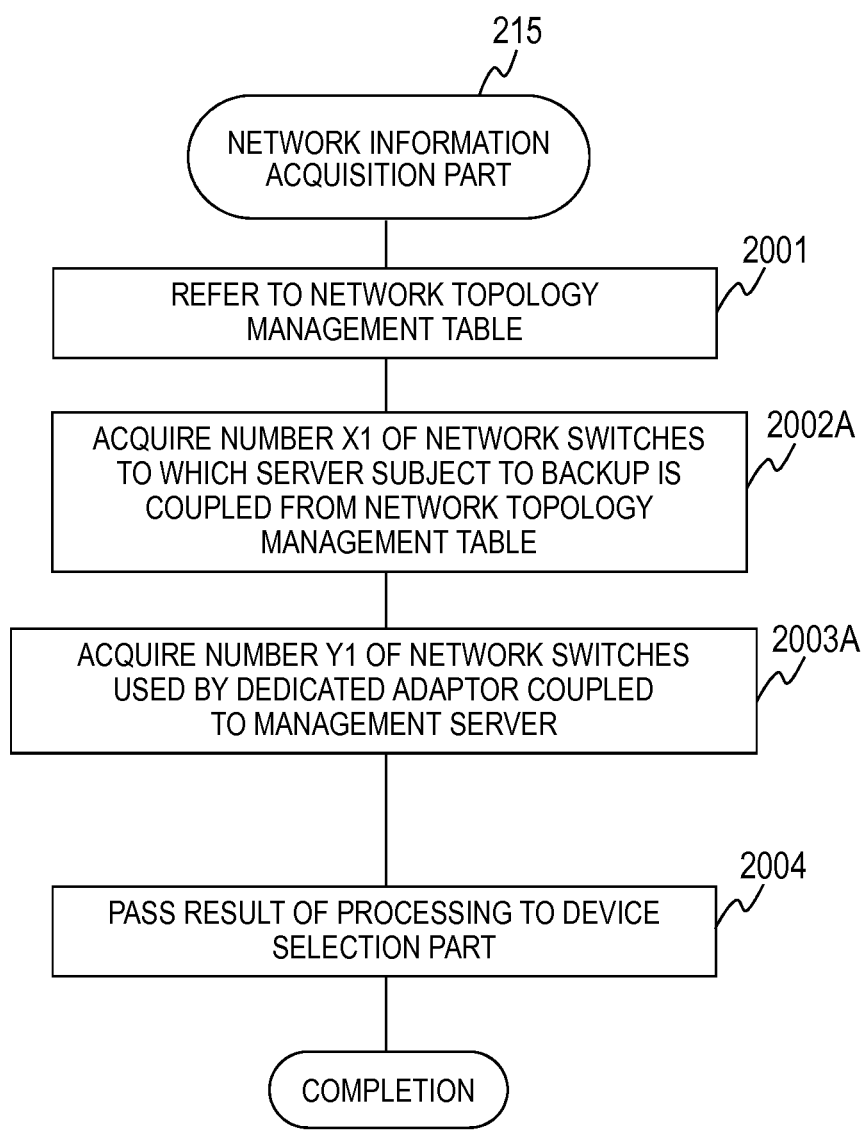
FIG. 28 is a flowchart illustrating an example of processing carried out by the network information acquisition part according to the fifth embodiment of this invention.

FIGS. 27 and 28 illustrate a fifth embodiment of this invention, and are flowcharts acquired by partially changing FIGS. 19 and 20 in the fourth embodiment, and the other configuration is the same as the fourth embodiment. The fifth embodiment is such an example that the number of network switches through which the backup dedicate line 160 routes, and the number of network switches through which a line already coupled to the server subject to backup routes are acquired, and a line routing through a smaller number of network switches is selected. The configuration of the computer system is the same as that according to the third embodiment illustrated in FIG. 26.

In FIG. 28, Steps 2001 and 2004 are the same as those illustrated in FIG. 20 according to the fourth embodiment, and Steps 2002 and 2003 of FIG. 20 are changed to Steps 2002A and 2003A, respectively.

In Step 2002A, the network information acquisition part 215 acquires the number X1 of network switches constructing the management network (NW-SW 103) to which the server 102 subject to backup is coupled from the network topology management table 223.

In Step 2003A, the network information acquisition part 215 acquires the number Y1 of the network switches 1030 (NWSW2 and NWSW3, or NWSW4) constructing each of the networks between the management server 101 and the dedicated adaptors.

FIG. 27 is acquired by changing Step 1905 of FIG. 19 according to the fourth embodiment into Step 1905A, and the rest is the same as FIG. 19. In Step 1905A of FIG. 28, the number X1 of switches of the management network to which the server 102 subject to backup is coupled and the number Y1 of the network switches 1030 (NWSW2 and NWSW3, or NWSW4) constructing the network between the management server 101 and the dedicated adaptor are compared with each other. Then, when the number Y1 of switches is equal to or lower than the number X1 of switches, the processing proceeds to Steps 1906 and 1907, and the device selection part 211 assigns the dedicated adaptor 452 to the server 102.

As a result, according to the fifth embodiment, the number of network switches relating to the backup can be restrained to be low, and even when the backup causes a failure, or consumes a large amount of the network bandwidth, the influence on the entire system can be restrained to the minimum.

<Sixth Embodiment>

Figure 29:
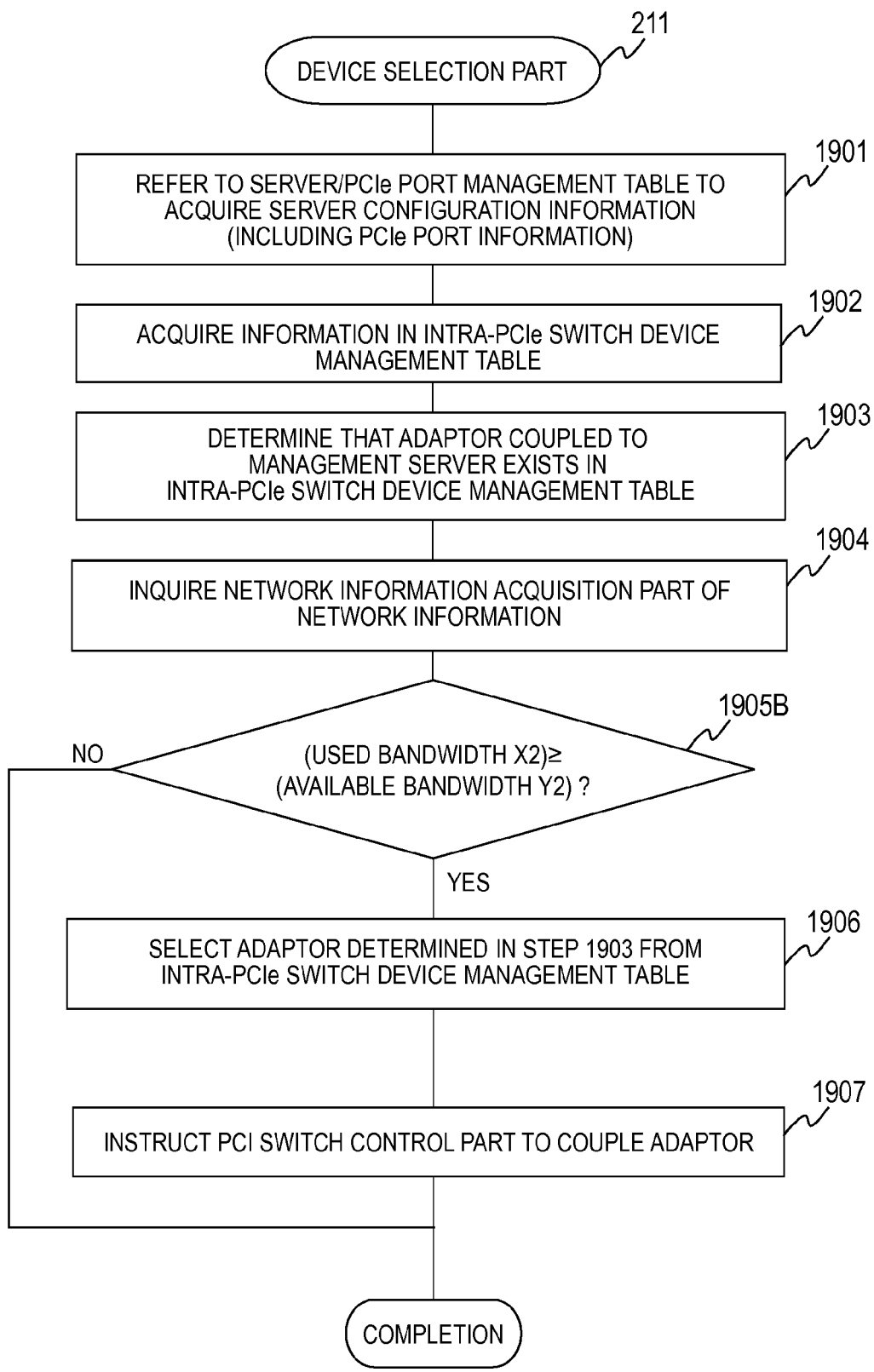
FIG. 29 is a flowchart illustrating an example of processing carried out by the device selection part according to a sixth embodiment of this invention.

FIGS. 29 and 30 illustrate a sixth embodiment of this invention. The sixth embodiment is such an example that, when an adaptor already coupled to the server 102 cannot provide a bandwidth (or transfer speed) required for the backup, the management server 101 searches for an adaptor wider in bandwidth (or faster in transfer speed) than the adaptor, and assigns the retrieved adaptor as the backup adaptor to the server 102. The backup can be finished in time by securing the performance of the backup adaptor to be assigned to the server 102 subject to backup. The computer system according to the sixth embodiment is the same as the computer system illustrated in FIG. 26 according to the third embodiment (and the fourth embodiment).

FIG. 30 is a flowchart illustrating an example of processing carried out by the network information acquisition part 215, which is carried out in place of the flowchart of FIG. 20 according to the fourth embodiment.

In Step 2101, the network information acquisition part 215 refers to the business task type management table 224 to calculate a permissible backup time from the operation schedule 1604 of the server 102 subject to backup. The permissible backup time can be calculated as, for example, a time period from a current time (or a predetermined start time of backup) to a next operation start (a start time of the operation schedule 1604).

In Step 2102, the network information acquisition part 215 acquires the disk capacity 603 of the server 102 subject to backup from the server/PCIe port management table 221. Then, the network information acquisition part 215 calculates a used bandwidth amount X2 (required transfer speed) required for the backup by dividing the disk capacity 603 by the permissible backup time.

In Step 2103, the network information acquisition part 215 refers to the intra-PCIe switch device management table 222 to acquire an available bandwidth amount (available transfer speed) Y2 of the line already coupled to the server 102 subject to backup.

In Step 2104, the network information acquisition part 215 passes the used bandwidth amount (transfer speed) X2 required for the backup and the available bandwidth amount Y2 of the server 102 subject to backup to the device selection part 211.

FIG. 29 is a flowchart illustrating an example of processing carried out by the device selection part 211 in place of the processing in FIG. 19 according to the fourth embodiment.

In place of Step 1905 of FIG. 19 according to the fourth embodiment, in Step 1905B of FIG. 29, the used bandwidth amount X2 required for the backup and the available bandwidth amount Y2 of the line already coupled to the server 102 subject to backup are compared with each other. When the available bandwidth amount Y2 of the line is equal to or less than the used bandwidth amount X2 required for the backup, the processing proceeds to processing starting from Step 1906, and the device selection part 211 transmits an instruction to couple the adapter determined in Step 1903 to the server 102 subject to backup to the PCI switch control part 214, thereby assigning the adaptor as the backup adaptor to the server 102.

As a result, even if the required used bandwidth amount is not satisfied by the adaptor coupled to the server 102 during the backup, the backup time can be reduced by using another adaptor.

<Seventh Embodiment>

Figure 21:
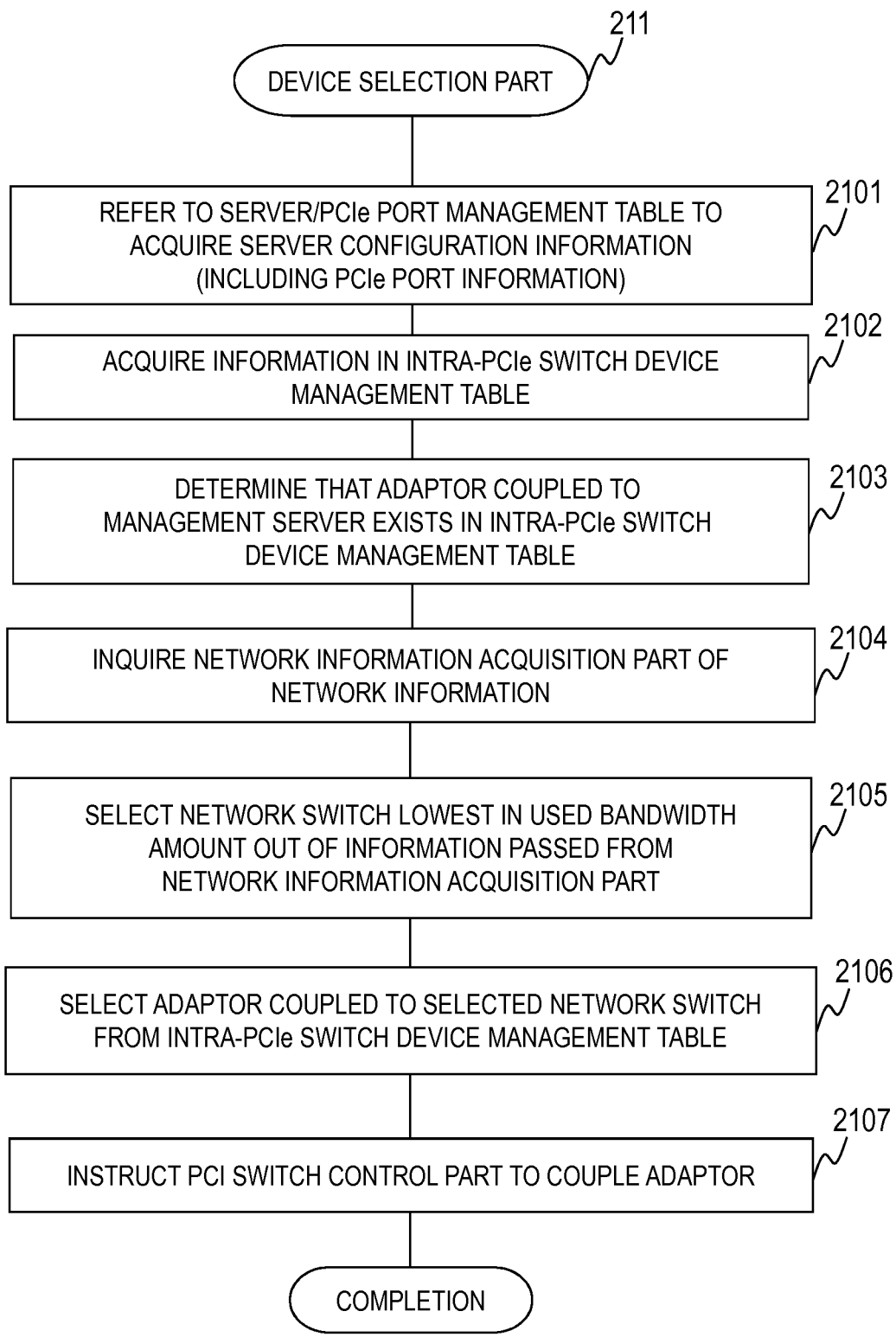
FIG. 21 is a flowchart illustrating an example of processing carried out by the device selection part of the management server according to a seventh embodiment of this invention.
Figure 22:
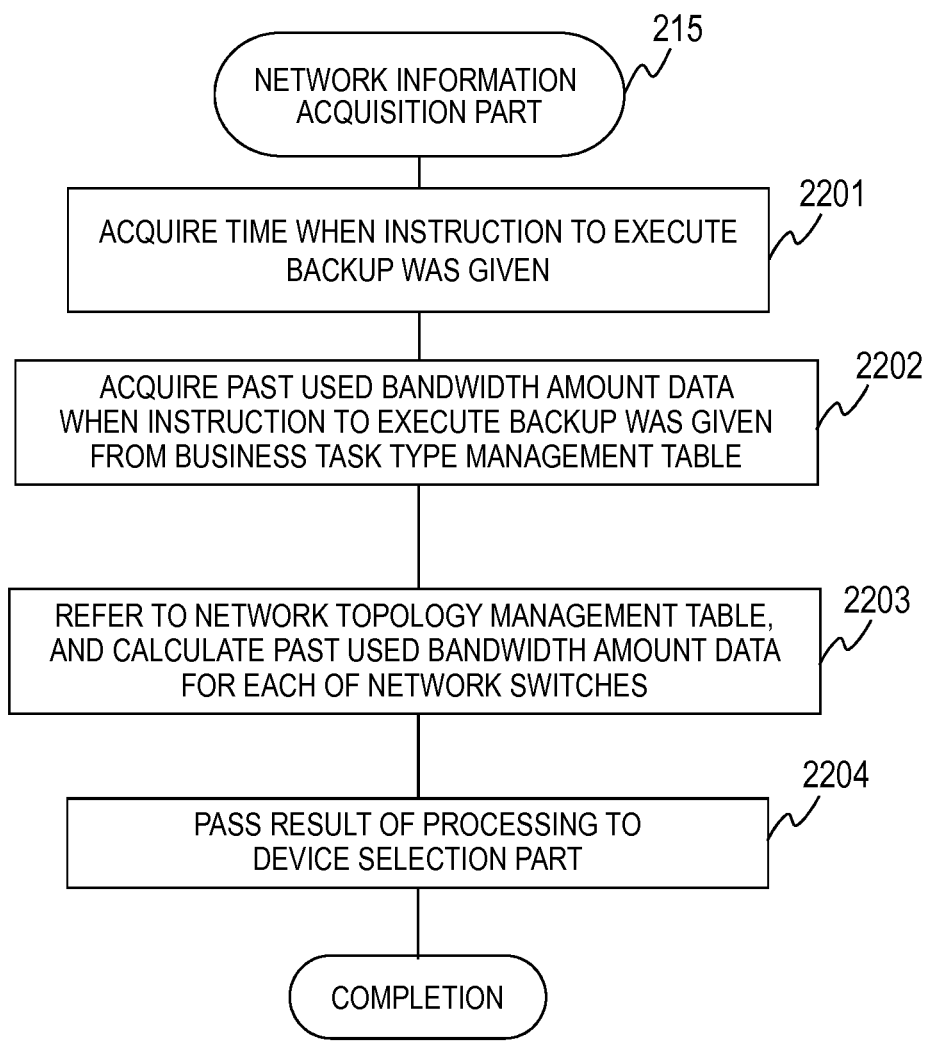
FIG. 22 is a flowchart illustrating an example of processing carried out by the network information acquisition part of the management server according to the seventh embodiment of this invention.

FIGS. 21 and 22 illustrate a seventh embodiment of this invention. The seventh embodiment is a method for reducing the time required for the backup by using a line small in used bandwidth amount during past business hours for the backup. The computer system according to the seventh embodiment is the same in system configuration as that according to the third embodiment illustrated in FIG. 26.

According to the seventh embodiment, in place of FIG. 17 according to the third embodiment, a flowchart of FIG. 21 illustrates processing carried out by the device selection part 211. Moreover, in place of FIG. 18 according to the third embodiment, a flowchart of FIG. 22 illustrates processing carried out by the network information acquisition part 215.

FIG. 21 illustrates the processing carried out by the device selection part 211 after the device selection part 211 receives the server identifier from the trap detection part 212, which is described above in the first embodiment.

In Step 2101, the device selection part 211 searches the server/PCIe port management table 221 (refer to FIG. 6) based on the passed server identifier. The device selection part 211 acquires server configuration information on the server 102 subject to backup (including information on the PCIe ports) based on the passed server identifier from the server/PCIe port management table 221.

In Step 2102, the device selection part 211 acquires information in the intra-PCIe switch device management table 222.

In Step 2103, the device selection part 211 determines that an adaptor coupled to the management server 101 exists in the intra-PCIe switch device management table 222. In this processing, if the management server 101 and the PCIe-SW 107 are directly coupled to each other, and a device 711 equal in the MAC address in the column 713 to the network interface 204 of the management server 101 exists, the device selection part 211 can determine that the adaptor coupled to the management server 101 exists. Moreover, even if the management server 101 and the PCIe-SW 107 are not directly coupled to each other, the device selection part 211 can determine that the adaptor coupled to the management server 101 through the network exists based on the switch information in the column 704. Then, the device selection part 211 acquires the slot number of the backup adaptor and the number of the PCIe port to which the management server 101 is coupled.

In Step 2104, the device selection part 211 inquires the network information acquisition part 215 of information on the network switches. The information on the network switches includes the past used bandwidth amount (or bandwidth usage rate) of each of the network switches 1030 as described later.

In Step 2105, the device selection part 211 selects a network switch 1030 to which the dedicated line 160 is coupled, and is the lowest in the used bandwidth amount (or the bandwidth usage rate) out of the information on the network switches passed from the network information acquisition part 215.

In Step 2106, the device selection part 211 selects an adaptor coupled to the network switch 1030 selected in Step 2105 from the intra-PCIe switch device management table 222. The device selection part 211 configures the selected adaptor as the backup adaptor.

In Step 2107, the device selection part 211 sends an instruction to the PCI switch control part 214 to couple the backup adaptor selected in Step 2106 to the server 102.

As a result of the processing, a path routing through the network switch 1030 lowest in the past used bandwidth amount of the network switch 1030 out of the backup network switches 1030 each coupled to the dedicated line 160 and the dedicated adaptor 452 is coupled to the server 102 subject to backup.

Moreover, in the seventh embodiment, FIG. 22 illustrates an example of processing carried out by the network information acquisition part 215 of acquiring the information on the past used bandwidth amounts (bandwidth usage rates) of the network switches.

In Step 2201, the network information acquisition part 215 acquires a time when an instruction to execute the backup was given. This time is, for example, a time when the trap detection part 212 acquired the command for the backup.

In Step 2202, the network information acquisition part 215 acquires data on the past used bandwidth amounts corresponding to the time when the instruction to execute the backup was given from the task type management table 224.

The network information acquisition part 215 acquires the used bandwidth amounts 1605 of the servers 102 operating at the time when the instruction to execute the backup was given.

In Step 2203, the network information acquisition part 215 refers to the network topology management table 223, and calculates a sum of the past used bandwidth amounts (in the current time period) for each of the network switches 1030 based on the used bandwidth amounts 1605 of the servers 102 acquired in Step 2202.

In Step 2204, the network information acquisition part 215 passes the sums of the past used bandwidth amounts of the network switches 1030 acquired in Step 2203 to the device selection part 211.

According to the seventh embodiment, a line (network switch 1030) considered to be low in the used bandwidth amount is selected based on the past used bandwidth amounts of the network switches 1030 to use the selected line for the backup. As a result, the speed of the backup can be increased.

<Eighth Embodiment>

In an eighth embodiment of this invention, an example of deployment or restoration directed to the server 102 is described.

The eighth embodiment is realized by changing the transfer of the data 120 from the subject server to the management server 101 in the backup processing to a transfer of the data 120 from the management server 101 to the subject server. Moreover, processing therefor can be realized by changing the backup carried out by the miniOS 300 in Step 1008 illustrated in FIG. 8 according to the first embodiment to the deployment or the restoration.

The eighth embodiment can restrain the consumption of other servers 102 other than the subject server and the network bandwidth during the deployment and the restoration.

<Ninth Embodiment>

Figure 23:
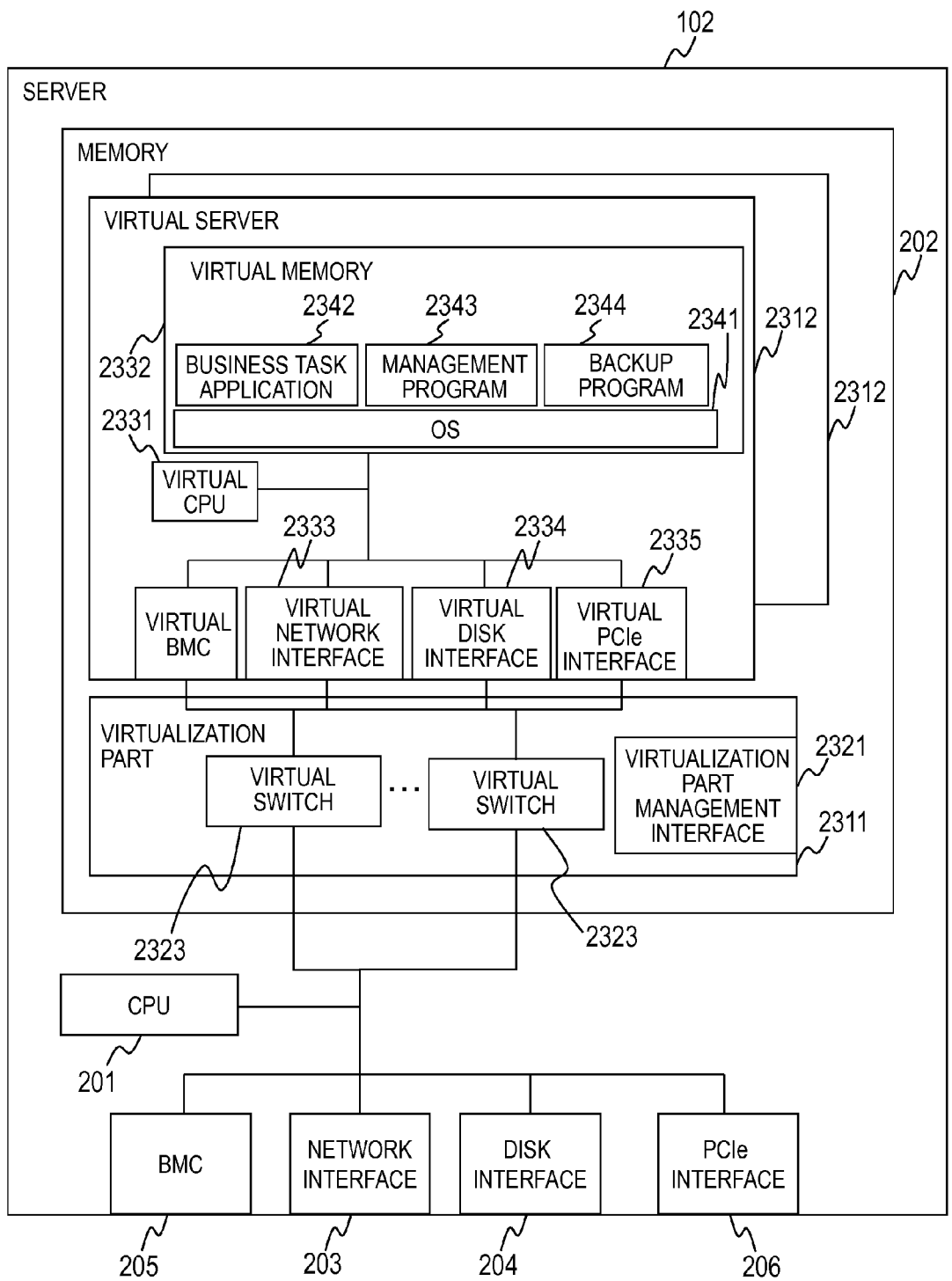
FIG. 23 is a block diagram illustrating an example of a sever according to a ninth embodiment of this invention.

FIG. 23 illustrates a ninth embodiment of this invention. In the ninth embodiment, such an example that this invention is applied to the server 102 (physical computer) according to the first embodiment in a virtual environment is described.

FIG. 23 is a block diagram of the server 102 for executing a virtualization part 2311 to provide a plurality of virtual servers 2312. Computer resources of the server 102 are virtualized by the virtualization part 2311 to provide at least one virtual server 2312. It should be noted that the virtualization part 2311 is constructed by, for example, a hypervisor or a virtual machine monitor (VMM).

The virtualization part 2311 for virtualizing the computer resources is disposed in the memory 202, and the at least one virtual server 2312 is provided on the server 102. Moreover, the virtualization part 2311 includes a virtualization part management interface 2321 as an interface for control. The virtualization part 2311 virtualizes the computer resources of the server 102 (or a blade server) to construct the virtual servers 2312. The virtual server 2312 includes a virtual CPU 2331, a virtual memory 2332, a virtual network interface 2333, a virtual disk interface 2334, and a virtual PCIe interface 2335. In the virtual memory 2332, an OS 2341 is disposed to manage a virtual device group in the virtual server 2312. Moreover, a business task application 2342 is executed on the OS 2341. A management program 2343 operating on the OS 2341 provides failure detection, OS power supply control, inventory management, and the like.

The virtualization part 2311 manages correspondences between the physical computer resources and virtual computer resources. Moreover, the virtualization part 2311 manages an amount of the computer resources of the server 102 assigned to each of the virtual servers 2312, and further holds configuration information and operation history. The virtualization part 2311 includes virtual switches 2323 for communication between the virtual servers. The virtual switch 2323 can couple the adaptor coupled to the physical interface of the server 102 to the virtual server 2312. As a result, the virtual server 2312 can use the adaptor coupled to the interface held by the server 102.

The virtualization part management interface 2321 is an interface for the virtualization part 2311 to communicate to/from the management server 101, and is used to notify the management server 101 of information from the virtualization part 2311, or to transmit an instruction from the management server 101 to the virtualization part 2311. Moreover, the virtualization part management interface 2321 can be used directly from the user terminal or the like.

Figure 24A:
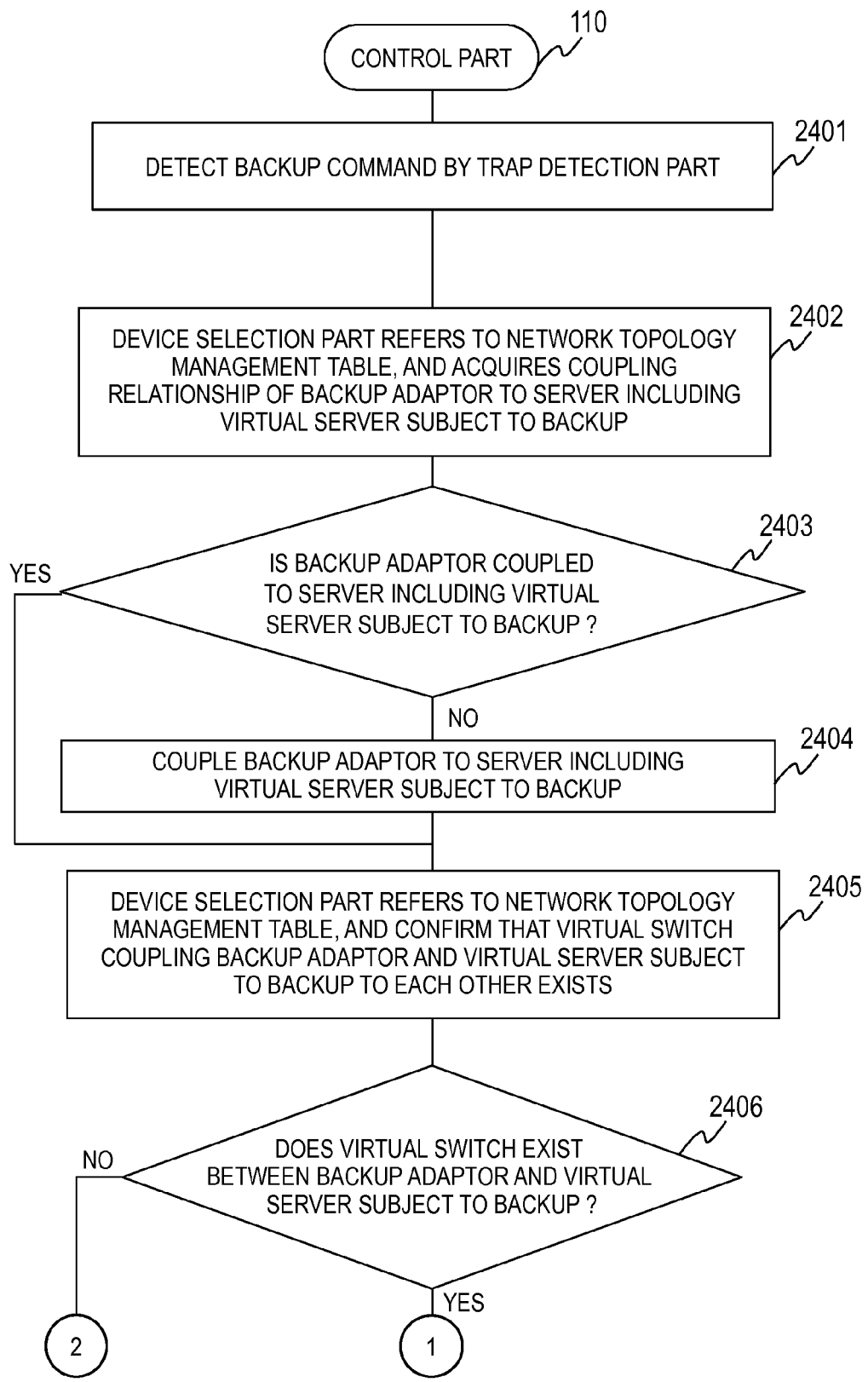
FIG. 24A is the first part of a flowchart illustrating an example of processing carried out by the control part of the management server according to the ninth embodiment of this invention.
Figure 24B:
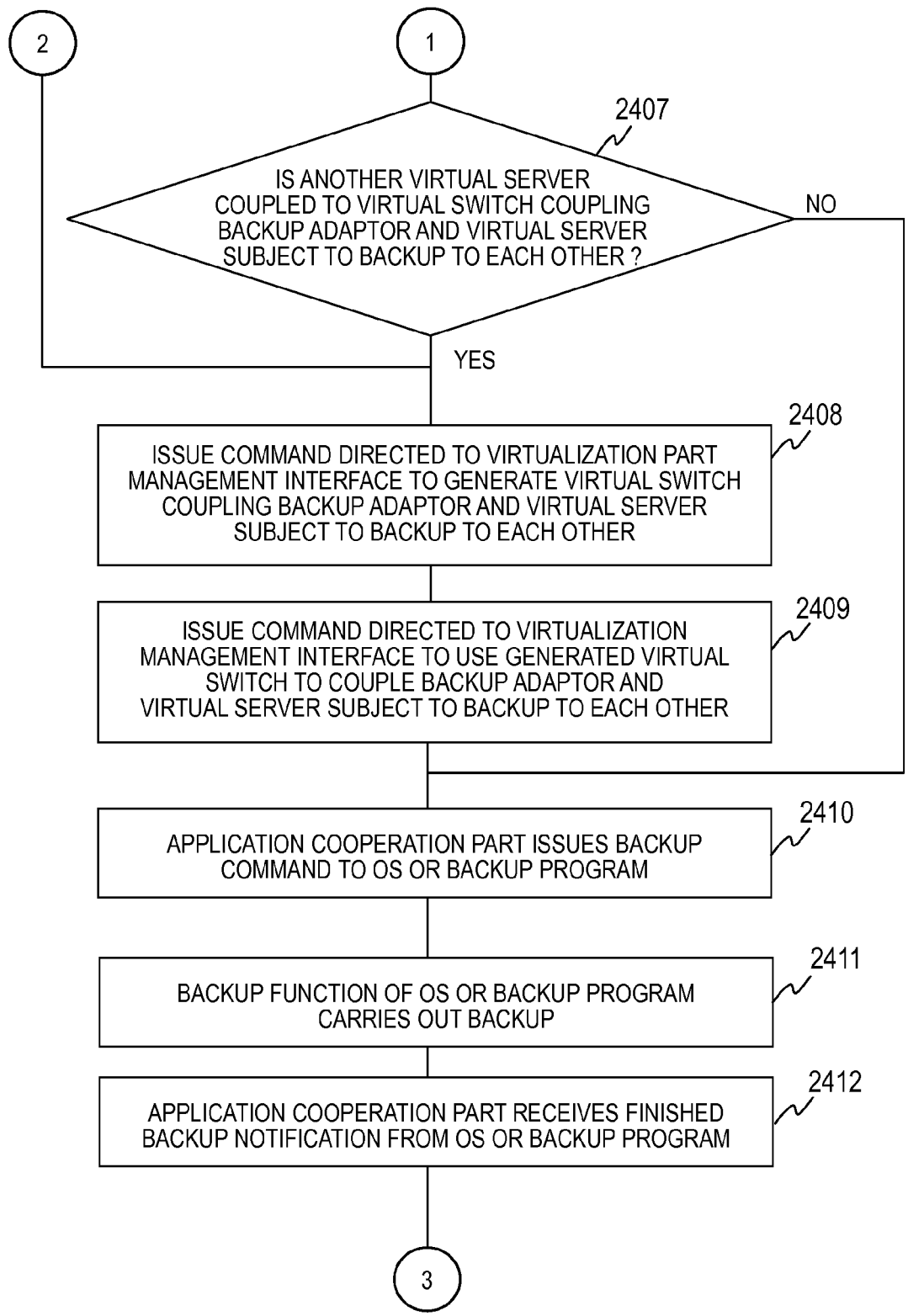
FIG. 24B is a middle part of the flowchart illustrating an example of processing carried out by the control part of the management server according to the ninth embodiment of this invention.
Figure 24C:
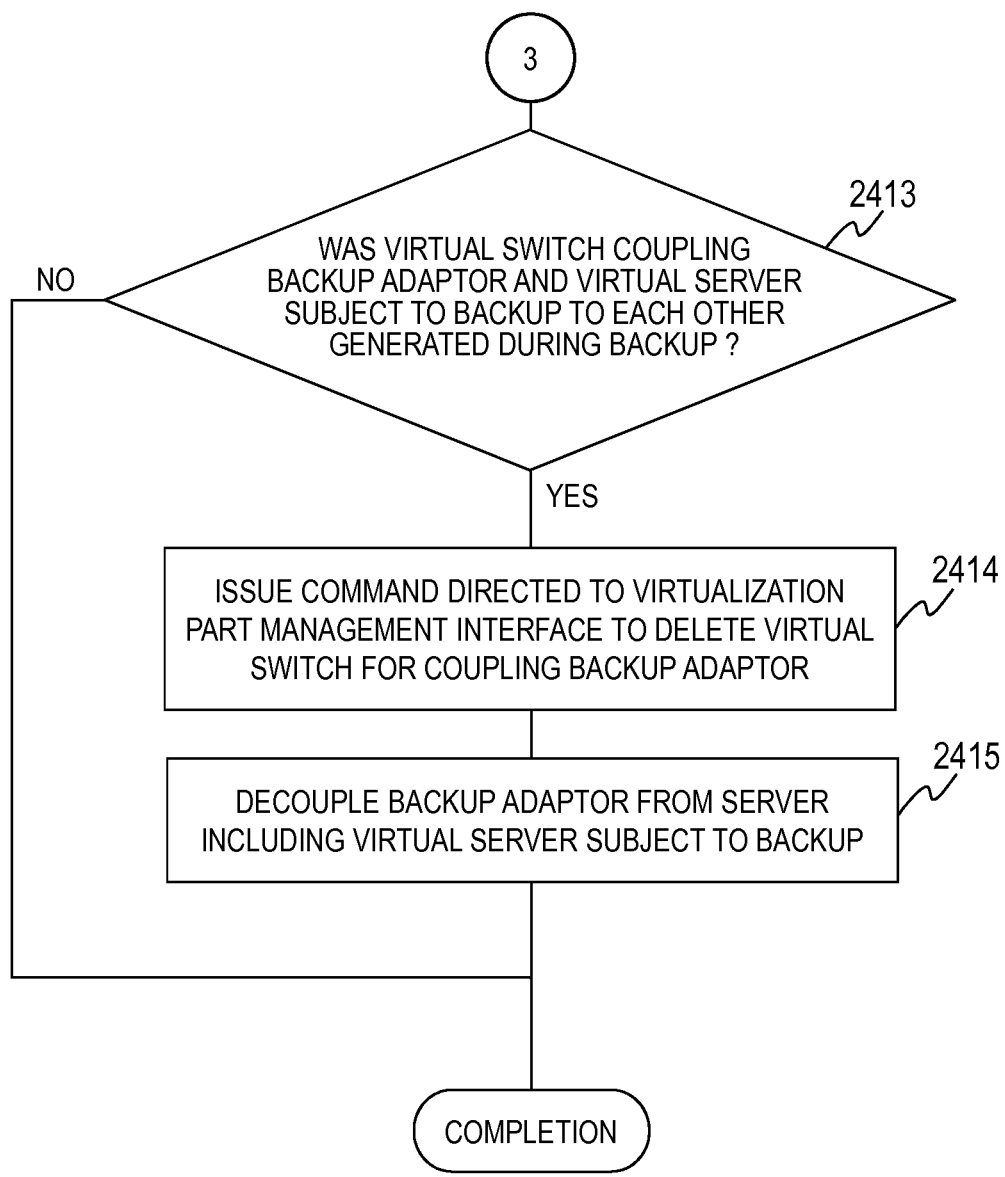
FIG. 24C is a last part of the flowchart illustrating an example of processing carried out by the control part of the management server according to the ninth embodiment of this invention.

FIGS. 24A, 24B, and 24C illustrate a flowchart of an example of processing carried out by the control part 110 according to the ninth embodiment. It should be noted that FIG. 24A illustrates a first part of the flowchart, FIG. 24B illustrate a middle part of the flowchart, and FIG. 24C illustrates a last part of the flowchart.

In Step 2401, as in the first embodiment, the trap detection part 212 detects the backup command. When the trap detection part 212 detects the backup command, the processing proceeds to Step 802. It should be noted that the trap detection part 212 detects the identifier or the like of a server 102 subject to backup from the backup command.

In Step 2402, the device selection part 211 refers to the network topology management table 223 to confirm that the backup adaptor 452 is coupled to a server 102 including a virtual server 2312 subject to backup. It should be noted that the network topology management table 233 includes network information including the virtual switches 2323 and the virtual servers 2312, and the control part of the management server 11 can thus acquire a coupling relationship between the backup adaptor 452 and the virtual server 2312.

In Step 2403, the control part 110 determines whether or not the backup adaptor 452 is coupled to the server 102 including the virtual server 2312 subject to backup. If the backup adaptor 452 is coupled to the server 102 including the virtual server 2312 subject to backup, the processing proceeds to Step 2405, and thus skips Step 2404.

In Step 2404, the control part 110 couples the backup adaptor 452 to the server 102 including the virtual server 2312 subject to backup. On this occasion, a method of coupling the backup adaptor 452 may be physical coupling by means of the PCIe-SW 107 or the like, or logical coupling by means of the network switch.

In Step 2405, the device selection part 211 of the control part 110 refers to the network topology management table 223 to confirm that a virtual switch 2323 coupling the backup adaptor 452 and the virtual server 2312 subject to backup to each other exists in the virtualization part 2311.

In Step 2406, the control part 110 determines whether or not a virtual switch 2323 coupling the backup adaptor 452 and the virtual server 2312 subject to backup to each other exists. If the virtual switch 2323 coupling the backup adaptor 452 and the virtual server 2312 subject to backup to each other exists, the processing proceeds to Step 2407, and otherwise, the processing proceeds to Step 2408.

In Step 2407, the control part 110 determines whether or not a virtual server 2312 other than the virtual server 2312 subject to backup is coupled to the virtual switch 2323 coupling the backup adaptor 452 and the virtual server 2312 subject to backup to each other. If the virtual server 2312 other than the virtual server 2312 subject to backup is coupled to the virtual switch 2323 coupling the backup adaptor 452 and the virtual server 2312 subject to backup to each other, the processing proceeds to Step 2408 and otherwise, the processing proceeds to Step 2410.

In Step 2408, the device selection part 211 transmits, to the virtualization part management interface 2321, a command to generate a virtual switch 2323 coupling the backup adaptor 452 and the virtual server 2312 subject to backup to each other.

In Step 2409, a command is transmitted to the virtualization part management interface 2321 so as to couple the backup adaptor 452 and the virtual server 2312 subject to backup to each other by the virtual switch 2323 generated in Step 2408.

In Step 2410, the application cooperation part 213 transmits a backup command to the backup function of the OS 2341 or the backup program 330.

In Step 2411, the backup function of the OS 2341 or the backup program 330 carries out the backup. On this occasion, as in the first embodiment, the miniOS 300 may be transmitted to the virtual server 2312 subject to backup, thereby carrying out the backup. It should be noted that the power supply to the virtual server 2312 subject to backup is turned off on this occasion.

In Step 2412, the application cooperation part 213 receives a finished backup notification from the backup function of the OS 2341 or the backup program 330. If the backup is carried out by using the miniOS 300, the application cooperation part 213 receives the finished backup notification from the miniOS 300.

In Step 2413, if the virtual switch 2323 for coupling the backup adaptor 452 and the virtual server 2312 subject to backup to each other is generated in Step 2409, the processing proceeds to Step 2414. Otherwise, the backup processing is finished.

In Step 2414, a command to delete the virtual switch 2323 coupling the backup adaptor 452 and the virtual server 2312 subject to backup to each other is transmitted to the virtualization part management interface 2321.

In Step 2415, the backup adaptor 452 is decoupled from the virtual server 2312 subject to backup.

The virtualization part 2311 uses the switching of the path by the virtual switch 2323 and the interface held by the server 102 to build the dedicated backup line 160 between the virtual server 2312 and the management server 101.

What is claimed is:

1. A method of controlling an I/O switch in a computer system,
the computer system comprising:
a computer including a processor, a memory, and an I/O interface;
the I/O switch for coupling the I/O interface of each of a plurality of the computers and an I/O adaptor to each other;
a management computer for managing the I/O switch and the plurality of the computers; and
a first network for coupling the plurality of the computers and the management computer to each other,
the I/O switch transferring data between the management computer and the plurality of the computers,
the I/O switch including a dedicated adaptor coupled to the management computer,
the method comprising:
a first step of selecting, by the management computer, the computer for transferring the data out of the plurality of the computers based on a predetermined condition;

a second step of instructing, by the management computer, the I/O switch to couple the I/O interface of the selected computer and the dedicated adaptor to each other;

a third step of transferring, by the management computer, the data to/from the selected computer;

a fourth step of detecting, by the management computer, completion of the transfer of the data to/from the selected computer; and a fifth step of instructing, by the management computer, after the detection of the completion of the transfer of the data to/from the selected computer, the I/O switch to decouple the dedicated adaptor from the I/O interface of the selected computer.

2. A method of controlling an I/O switch according to claim 1, wherein the third step comprises:

a sixth step of instructing, by the management computer, the selected computer to restart; and a seventh step of controlling, by the management computer, the selected computer to execute an OS including a transfer function for the data after the restart of the selected computer.

3. A method of controlling an I/O switch according to claim 1, wherein the management computer manages the plurality of the computers via the first network.

4. A method of controlling an I/O switch according to claim 1, wherein the dedicated adaptor and the management computer are coupled to each other with a dedicated line for coupling the dedicated adaptor and the management computer via a network.

5. A method of controlling an I/O switch according to claim 1, wherein the dedicated adaptor is coupled via a second network to the management computer, wherein the second step comprises:

an eighth step of acquiring, by the management computer, a number X of computers coupled to the first network of the selected computer; and a ninth step of acquiring, by the management computer, a number Y of computers coupled to the second network, and wherein the second step further comprises comparing, by the management computer, the number X and the number Y with each other, and instructing, when the number X is larger than the number Y, the I/O switch to couple the I/O interface of the selected computer and the dedicated adaptor to each other.

6. A method of controlling an I/O switch according to claim 1, wherein the dedicated adaptor is coupled via a second network to the management computer, wherein the second step comprises:

a tenth step of acquiring, by the management computer, a number X1 of switches constructing the first network of the selected computer; and an eleventh step of acquiring, by the management computer, a number Y1 of switches constructing the second network, and wherein the second step further comprises comparing, by the management computer, the number X1 and the number Y1 with each other, and instructing, when the number Y1 is equal to or smaller than the number X1, the I/O switch to couple the I/O interface of the selected computer and the dedicated adaptor to each other.

7. A method of controlling an I/O switch according to claim 1, wherein the dedicated adaptor is coupled via a second network to the management computer, wherein the second step comprises:

a twelfth step of calculating, by the management computer, a transfer speed X2 required for the transfer of the data of the selected computer; and a thirteenth step of calculating, by the management computer, a transfer speed Y2 available on the first network, and wherein the second step further comprises comparing, by the management computer, the transfer speed X2 and the transfer speed Y2 with each other, and instructing, when the transfer speed Y2 is equal to or lower than the transfer speed X2, the I/O switch to couple the I/O interface of the selected computer and the dedicated adaptor to each other.

8. A method of controlling an I/O switch according to claim 1, wherein the dedicated adaptor is coupled via a second network to the management computer, wherein the second step comprises:

a fourteenth step of acquiring, by the management computer, business task importance degrees of business task applications respectively running on the plurality of the computers coupled to the first network; and a fifteenth step of selecting, by the management computer, a computer on which the business task application having a lowest business task importance degree out of the business task importance degrees is running, and wherein the second step further comprises instructing, by the computer, the I/O switch to couple the dedicated adaptor coupled to a switch coupled to the computer on which the business task application having the lowest business task importance degree is running and the I/O interface of the selected computer to each other.

9. A method of controlling an I/O switch according to claim 1, wherein the dedicated adaptor is coupled via a second network to the management computer, wherein the second step comprises:

a sixteenth step of acquiring, by the management computer, a start time of the transfer of the data;

a seventeenth step of acquiring, by the management computer, a used bandwidth amount during a past business task time of each of switches constructing the second network; and an eighteenth step of acquiring, by the management computer, a used bandwidth amount of the switch during the past business task time of the switch at the start time of the transfer of the data, and wherein the second step further comprises instructing, by the computer, the I/O switch to couple the dedicated adaptor coupled to the switch lowest in the used bandwidth amount during the past business task time of the switch and the I/O interface of the selected computer to each other.

10. A computer system, comprising:

a computer including a processor, a memory, and an I/O interface;

an I/O switch for coupling a plurality of the computers and an I/O adaptor to each other;

a management computer for managing the I/O switch and the plurality of the computers; and a first network for coupling the plurality of the computers and the management computer to each other, the computer system transferring data between the management computer and the plurality of the computers, the I/O switch including a dedicated adaptor coupled to the management computer, the management computer comprising:
- a transfer detection part for selecting the computer for transferring the data out of the plurality of the computers based on a predetermined condition;
- a switch control part for instructing the I/O switch to couple the I/O interface of the selected computer and the dedicated adaptor to each other; and
- a data transfer part for transferring the data between the management computer and the selected computer, the switch control part instructing, after the transfer of the data is completed by the data transfer part, the I/O switch to decouple the dedicated adaptor from the I/O interface of the selected computer.

11. A computer system according to claim 10, wherein the data transfer part instructs the selected computer to restart, and, after the restart of the selected computer, controls the selected computer to execute an OS including a transfer function for the data to transfer the data.

12. A computer system according to claim 10, wherein the management computer manages the plurality of the computers via the first network.

13. A computer system according to claim 10, wherein the dedicated adaptor and the management computer are coupled to each other with a dedicated line for coupling the dedicated adaptor and the management computer via a network.

14. A computer system according to claim 10,
wherein the dedicated adaptor is coupled via a second network to the management computer, and
wherein the switch control part acquires a number X of computers coupled to the first network of the selected computer and a number Y of computers coupled to the second network, compares the number X and the number Y with each other, and instructs, when the number X is larger than the number Y, the I/O switch to couple the I/O interface of the selected computer and the dedicated adaptor to each other.

15. A computer system according to claim 10,
wherein the dedicated adaptor is coupled via a second network to the management computer, and
wherein the switch control part acquires a number X1 of switches constructing the first network of the selected computer, acquires a number Y1 of switches constructing the second network, compares the number X1 and the number Y1 with each other, and instructs, when the number Y1 is equal to or smaller than the number X1, the I/O switch to couple the I/O interface of the selected computer and the dedicated adaptor to each other.

16. A computer system according to claim 10,
wherein the dedicated adaptor is coupled via a second network to the management computer, and
wherein the switch control part calculates a transfer speed X2 required for the transfer of the data of the selected computer, calculates a transfer speed Y2 available on the first network, compares the transfer speed X2 and the transfer speed Y2 with each other, and instructs, when the transfer speed Y2 is equal to or lower than the transfer speed X2, the I/O switch to couple the I/O interface of the selected computer and the dedicated adaptor to each other.

17. A computer system according to claim 10,
wherein the dedicated adaptor is coupled via a second network to the management computer, and
wherein the switch control part acquires business task importance degrees of business task applications respectively running on the plurality of the computers coupled to the first network of the selected computer, selects the computer on which the business task application having a lowest business task importance degree is running, and instructs the I/O switch to couple the dedicated adaptor coupled to a switch coupled to the selected computer and the I/O interface of the selected computer to each other.

18. A computer system according to claim 10,
wherein the dedicated adaptor is coupled via a second network to the management computer,
wherein the switch control part acquires a transfer start time of the data of the selected computer, and acquires a used bandwidth amount during a past business task time for each of switches constructing the second network, and
wherein the management computer acquires a past used bandwidth amount of the each of the switches at the transfer start time of the data, selects the switch lowest in the used bandwidth amount out of the switches, and instructs the I/O switch to couple the dedicated adaptor coupled to the selected switch and the I/O interface of the selected computer to each other.

* * * * *